(12) United States Patent
Yoon et al.

(10) Patent No.: US 11,323,637 B2
(45) Date of Patent: May 3, 2022

(54) DUAL CAMERA MODULE INCLUDING HYPERSPECTRAL CAMERA MODULE, APPARATUSES INCLUDING DUAL CAMERA MODULE, AND METHOD OF OPERATING THE SAME

(71) Applicant: SAMSUNG ELECTRONICS CO., LTD., Suwon-si (KR)

(72) Inventors: Youngzoon Yoon, Hwaseong-si (KR); Hyochul Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/105,103

(22) Filed: Nov. 25, 2020

(65) Prior Publication Data

US 2021/0176412 A1  Jun. 10, 2021

(30) Foreign Application Priority Data

Dec. 5, 2019  (KR) .................. 10-2019-0160962

(51) Int. Cl.
  *H04N 5/33* (2006.01)
  *G01J 3/02* (2006.01)
  *G01J 3/28* (2006.01)
  *H04N 9/76* (2006.01)
  *H04N 9/04* (2006.01)
  *H04N 9/09* (2006.01)

(52) U.S. Cl.
  CPC .......... *H04N 5/332* (2013.01); *G01J 3/0229* (2013.01); *G01J 3/2823* (2013.01); *H04N 9/04513* (2018.08); *H04N 9/09* (2013.01); *H04N 9/76* (2013.01); *G01J 2003/2826* (2013.01)

(58) Field of Classification Search
  CPC ...... H04N 5/332; H04N 9/04513; H04N 9/09; H04N 9/76; G01J 3/0229; G01J 3/2823; G01J 3/0272; G01J 3/28; G01J 3/0264; G01J 3/0248; G01J 2003/2826
  USPC ....................................................... 348/262
  See application file for complete search history.

(56) References Cited

U.S. PATENT DOCUMENTS 9,117,133 B2 * 8/2015 Barnes ................ A61B 5/7246
9,551,616 B2 * 1/2017 McQuilkin ........... G01J 3/0297
10,545,050 B2   1/2020 Yoon et al.
(Continued)

FOREIGN PATENT DOCUMENTS

JP   2019-95445 A      6/2019
KR   10-2018-0112100 A  10/2018
KR   10-2019-0084149 A   7/2019

OTHER PUBLICATIONS

Ying Fu et al., "Joint Camera Spectral Sensitivity Selection and Hyperspectral Image Recovery", Computer Vision Foundation, ECCV, 2018, pp. 1-17, 17 pages total.
(Continued)

*Primary Examiner* — Pritham D Prabhakher
(74) *Attorney, Agent, or Firm* — Sughrue Mion, PLLC

(57) ABSTRACT

A dual camera module including a hyperspectral camera module, an apparatus including the same, and a method of operating the apparatus are provided. The dual camera module includes a hyperspectral camera module configured to provide a hyperspectral image of a subject; and an RGB camera module configured to provide an image of the subject, and obtain an RGB correction value applied to correction of the hyperspectral image.

11 Claims, 29 Drawing Sheets

(56) References Cited

U.S. PATENT DOCUMENTS

| | | | |
|---|---|---|---|
| 10,580,170 B2* | 3/2020 | Robles-Kelly | G01J 3/28 |
| 10,666,878 B1* | 5/2020 | Fourspring | H04N 5/2353 |
| 10,861,143 B2* | 12/2020 | Kim | G06N 3/0454 |
| 11,134,848 B2* | 10/2021 | Bala | G06T 7/11 |
| 2015/0015692 A1* | 1/2015 | Smart | G01J 3/51 |
| | | | 348/77 |
| 2016/0069743 A1* | 3/2016 | McQuilkin | G01N 21/31 |
| | | | 356/416 |
| 2017/0089761 A1* | 3/2017 | McQuilkin | G01J 3/0272 |
| 2017/0303790 A1 | 10/2017 | Bala et al. | |
| 2018/0308260 A1* | 10/2018 | Robles-Kelly | G01J 3/2823 |
| 2019/0096049 A1 | 3/2019 | Kim et al. | |
| 2019/0101444 A1 | 4/2019 | Yoon et al. | |
| 2019/0363116 A1* | 11/2019 | Raz | G02B 26/001 |
| 2020/0116567 A1 | 4/2020 | Yoon et al. | |
| 2020/0397236 A1* | 12/2020 | Talbert | A61B 1/00186 |
| 2020/0397350 A1* | 12/2020 | Talbert | G06T 7/0016 |

OTHER PUBLICATIONS

Rei Kawakami et al., "High-resolution Hyperspectral Imaging via Matrix Factorization", CVPR '11: Proceedings of the 2011 IEEE Conference on Computer Vision and Pattern Recognition, Jun. 2011, pp. 2329-2336, 8 pages total.

* cited by examiner

FIG. 23

| SP1 (SECOND AVERAGE VALUE+$\Delta$1) | SP2 (SECOND AVERAGE VALUE+$\Delta$2) |
|---|---|
| SP3 (SECOND AVERAGE VALUE+$\Delta$3) | SP4 (SECOND AVERAGE VALUE+$\Delta$4) |

FIG. 25
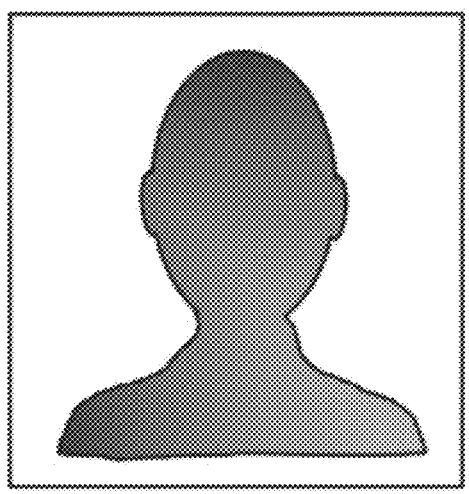
(a)
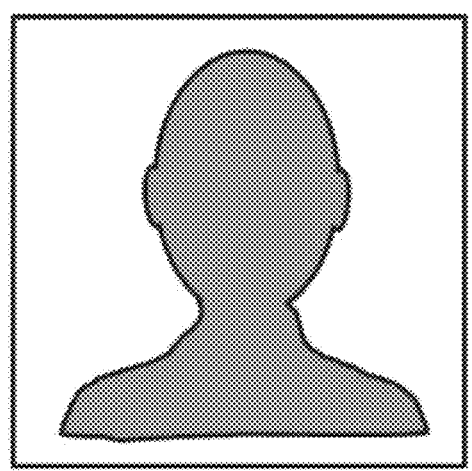
(b)

DUAL CAMERA MODULE INCLUDING HYPERSPECTRAL CAMERA MODULE, APPARATUSES INCLUDING DUAL CAMERA MODULE, AND METHOD OF OPERATING THE SAME

CROSS-REFERENCE TO RELATED APPLICATION

This application claims priority to Korean Patent Application No. 10-2019-0160962, filed on Dec. 5, 2019, in the Korean Intellectual Property Office, the disclosure of which is incorporated herein in its entirety by reference.

BACKGROUND

1. Field

Example embodiments consistent with the present disclosure relate to camera modules and applications thereof, and more particularly, to dual camera modules including a hyperspectral camera module, apparatuses including the same, and methods of operating the apparatuses.

2. Description of Related Art

A hyperspectral image may be measured by a scanning method or a snapshot method. The scanning method may be realized by combining scanning equipment with a spectral image sensor and may simultaneously acquire an image and a spectrum by exchanging a slit-like spectrum or a front filter. The snapshot method is a non-scanning method of measuring a hyperspectral image by implementing different filters directly on an image pixel.

SUMMARY

Provided are dual camera modules that increase resolution of a hyperspectral image.

Provided are dual camera modules including a hyperspectral camera module that may correctly recognize a shape of a three-dimensional subject.

Provided are dual camera modules including a hyperspectral camera module that may correct an error due to a distance between cameras.

Provided are hyperspectral camera modules that may increase resolution of a hyperspectral image.

Provided are apparatuses including a camera module that may increase resolution of a hyperspectral image.

Provided are methods of operating the apparatuses.

Additional aspects will be set forth in part in the description which follows and, in part, will be apparent from the description, or may be learned by practice of the presented embodiments of the disclosure.

According to an aspect of an example embodiment, there is provided a dual camera module providing a corrected image of a hyperspectral image, the dual camera module including: a hyperspectral camera module configured to provide a hyperspectral image of a subject; and an RGB camera module configured to provide an image of the subject, and obtain an RGB correction value applied to correction of the hyperspectral image.

The image of the subject provided by the RGB camera module may include an RGB image obtained by using red light, green light, and blue light as a main light, or an image obtained by using infrared light together with red light, green light, and blue light as the main light.

The main light may further include ultraviolet light.

The RGB camera module may include a first optical guide module and a first image sensor configured to sense the image of the subject.

The first image sensor may include a plurality of pixels, and each pixel of the plurality of pixels may include four different sub-pixels.

The first image sensor may include a plurality of pixels, and each pixel of the plurality of pixels may include six sub-pixels.

Five sub-pixels of the six sub-pixels may be different from each other.

The hyperspectral camera module may include: a second optical guide module; a hyperspectral filter configured to generate the hyperspectral image; and a second image sensor configured to sense the hyperspectral image.

The dual camera module may further include a low pass filter provided between the second optical guide module and the hyperspectral filter.

According to an aspect of an example embodiment, there is provided an electronic apparatus including: a display on which an image of a subject is displayed; a dual camera module configured to provide a corrected image of a hyperspectral image of the subject; a driving control circuit unit configured to control the dual camera module; and a battery that provides power to the dual camera module, wherein the dual camera module includes a hyperspectral camera module configured to provide the hyperspectral image of the subject; and an RGB camera module configured to provide the image of the subject and obtain an RGB correction value applied to correction of the hyperspectral image.

The electronic apparatus may further include a light source configured to illuminate the subject.

According to an aspect of an example embodiment, there is provided a mirror-type display apparatus, including: a mirror-type display; a light source provided around the mirror-type display; a first camera module that provides a first image of a subject; and a second camera module that provides a second image of the subject, wherein the first image have first spectral characteristics and the second image have second spectral characteristics which are different from the second spectral characteristics.

One of the first camera module and the second camera module may include a hyperspectral camera module.

According to an aspect of an example embodiment, there is provided a method of operating an apparatus including a dual camera module, the method including: acquiring, by a first camera module, a first image including first spectral information; acquiring, by a second camera module different from the first camera module, a second image including second spectral information, an amount of the second spectral information being greater than an amount of the first spectral information; and increasing a resolution of the second image by using the first spectral information of the first image.

The first image may be an RGB image having a resolution that is higher than the resolution of the second image.

The second image may be a hyperspectral image.

The increasing of the resolution of the second image may include: obtaining a first average value and a deviation of the first spectral information of the first image; obtaining a second average value of the second spectral information of the second image; and adding the deviation to the second average value.

The obtaining of the first average value and the deviation may include: obtaining a first average R value, a first average G value, and a first average B value of a plurality of pixels included in a first image sensor by which the first image is sensed; and obtaining, for each pixel of the plurality of pixels, deviations between the first average R value, the first average G value, and the first average B value and a respective R value, G value, and B value of the pixel.

The obtaining of the second average value may include: dividing a unit pixel of a second image sensor, by which the second image is sensed, into a plurality of spectral pixels, wherein each spectral pixel from among the plurality of spectral pixels includes a plurality of channels; and obtaining a second average R value, a second average G value, and a second average B value for the plurality of spectral pixels, wherein a number of the plurality of spectral pixels is less than a number of the plurality of channels, and the number of the plurality of spectral pixels varies depending on a number of sub-pixels included in each pixel from among the plurality of pixels included in the first image sensor.

The number of sub-pixels may be four or six.

According to an aspect of an example embodiment, there is provided a hyperspectral camera module providing a corrected hyperspectral image, the hyperspectral camera module including: a first camera module configured to provide a first image of a subject; and a second camera module configured to provide a second image of the subject, wherein the second image is different from the first image.

The first image may include an RGB image.

The first image may include an image obtained by using red light, green light, blue light, and infrared light as main light.

The first image may include an image obtained by using red light, green light, blue light, and UV light as main light.

The first image may include an image obtained by using red light, green light, blue light, infrared light, and UV light as main light.

The hyperspectral camera module may be configured to obtain an RGB correction value based on the first image and to obtain a hyperspectral image based on the RGB correction value.

The second image may include an uncorrected hyperspectral image.

BRIEF DESCRIPTION OF THE DRAWINGS

The above and other aspects, features, and advantages of certain example embodiments of the disclosure will be more apparent from the following description taken in conjunction with the accompanying drawings, in which:

FIG. 23 is a plan view of an RGB correction for each of the spectral pixels corresponding to unit pixels of the hyperspectral filter;

FIG. 25 shows an image (a) of a subject showing the effect of unevenness of illumination and an image (b) of the subject when the unevenness of illumination is corrected in a subject photographing by using the apparatus of FIG. 24;

DETAILED DESCRIPTION

Figure 1:
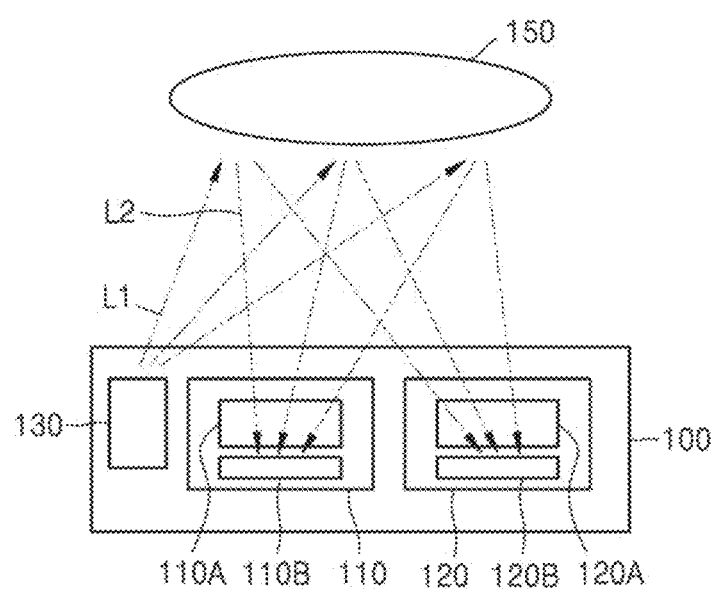
FIG. 1 is a cross-sectional view of a dual camera module including a hyperspectral camera module according to an example embodiment.

Reference will now be made in detail to embodiments, examples of which are illustrated in the accompanying drawings, wherein like reference numerals refer to like elements throughout. In this regard, example embodiments may have different forms and should not be construed as being limited to the descriptions set forth herein. Accordingly, the example embodiments are merely described below, by referring to the figures, to explain aspects.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The advantages, features, and methods of achieving the advantages may be clear when referring to the example embodiments described below together with the drawings. However, embodiments may have different forms and should not be construed as being limited to the descriptions set forth herein. Rather, these example embodiments are provided so that this disclosure will be thorough and complete, and will fully convey the scope of the disclosure to those of ordinary skill in the art. Embodiments will be defined by the appended claims. In the drawings, thicknesses of layers and regions may be exaggerated for convenience of explanation.

Terminologies used in the specification will be briefly described and the current example embodiment will be described in detail.

Terminologies used herein are selected as commonly used by those of ordinary skill in the art in consideration of functions of the current example embodiment, but may vary according to the technical intention, precedents, or a disclosure of a new technology. However, the terms may have different meanings according to the intention of one of ordinary skill in the art, and in this case, the meaning of the selected terms will be described in detail in the detailed description of the disclosure. Thus, the terms used herein should be defined based on the meaning of the terms together with the description throughout the specification.

It should be understood that, when a part "comprises" or "includes" an element in the specification, unless otherwise defined, it is not excluding other elements but may further include other elements.

Hereinafter, a dual camera module including a hyperspectral camera module according to example embodiments, apparatuses including the same, and a method of operating the apparatuses will be described in detail with reference to the accompanying drawings. Since the dual camera module described below, as a result, will provide a hyperspectral image, it may also be referred to as a hyperspectral camera module. Embodiments described below are merely examples, and various modifications are possible. It will be understood that when an element or layer is referred to as being "on" or "above" another element or layer, the element or layer may be directly on another element or layer or there may be intervening elements or layers.

FIG. 1 is a cross-sectional view of a dual camera module 100 including a hyperspectral camera module according to an example embodiment.

Referring to FIG. 1, the dual camera module 100 including a hyperspectral camera includes two different types of camera modules, that is, first and second camera modules 110 and 120 and a first light source 130. The first and second camera modules 110 and 120 may have different configurations and uses from each other. The first camera module 110 is a visible light camera module for acquiring a first image, that is, an RGB image of a subject 150 by using red light R, green light G, and blue light B as main light. Therefore, the first camera module 110 may be referred to as an RGB camera module 110. The first camera module 110 may be a general camera module, not a hyperspectral camera. For example, the first camera module 110 may be a camera module mounted on a small mobile device, such as a mobile phone for taking or photographing an image of the subject 150 by using R, G, and B as main light. The first camera module 110 may include a first optical guide module 110A and a first image sensor 110B, wherein the first optical guide module 110A receives light L2 reflected from the subject 150 among light L1 emitted from the first light source 130 to the subject 150 and allows the light L2 to reach the first image sensor 110B. The first optical guide module 110A may include a lens or a lens system and may be disposed in front of a surface of the first image sensor 110B on which the light L2 is incident. The light L2 reflected from the subject 150 passes through the first optical guide module 110A and enters the first image sensor 110B. The first optical guide module 110A is between the subject 150 and the first image sensor 110B. The first optical guide module 110A may include a single lens or two or more lenses on the optical axis. The first image sensor 110B provided to sense the first image transmitted from the first optical guide module 110A may be, for example, a CMOS image sensor, but is not limited thereto. The first light source 130 may be a light source providing a sufficient amount of light or a minimum amount of light necessary for capturing an image of the subject 150 by using the first camera module 110 in an environment in which there is not enough illumination to capture an image of the subject 150. If external light provides illuminance sufficient to capture an image of the subject 150, the first light source 130 may not be used. In one example, the first light source 130 may or may not be included in the dual camera module 100 as an optional member. The first light source 130 may be used as a general lighting means by being connected to a power source of an apparatus on which the dual camera module 100 is mounted regardless of the use of the dual camera module 100. The second camera module 120 disposed parallel to the first camera module 110 may be a camera module having a configuration and purpose different from that of the first camera module 110. For example, the second camera module 120 may be a hyperspectral camera module 120 that provides a hyperspectral image of the subject 150. The second camera module 120 may include a second optical guide module 120A and a second image sensor 120B. Since the use of the second camera module 120 is completely different from that of the first camera module 110, the configuration of the second optical guide module 120A may be different from that of the first optical guide module 110A.

The subject 150 may be a person or an object. If subject 150 is a human, the subject 150 may be a hand, face, or skin of a specific part.

A hyperspectral image of the subject 150 may be recorded in the second image sensor 120B. The hyperspectral image may include spectral information (i.e., a spectrum) together with image information about the subject 150. The second image sensor 120B may be a CMOS image sensor.

When the dual camera module 100 of FIG. 1 is used, an RGB image of the subject 150 may be obtained through the first camera module 110, and at the same time, a hyperspectral image of the subject 150 may be obtained through the second camera module 120. The resolution of the hyperspectral image obtained through the second camera module 120 may be improved by using the spectral information of the RGB image obtained through the first camera module 110, which will be described later. The first and second camera modules 110 and 120 may be operated in real time. Therefore, when the dual camera module 100 is mounted in an apparatus including a communication module and a display module (for example, a medical display apparatus or a mobile phone), an RGB image and a hyperspectral image of the subject 150 may be observed in real time, and the correction with respect to the hyperspectral image may be performed in real time. In other words, the resolution improvement of the hyperspectral image may be observed in real time.

Figure 2:
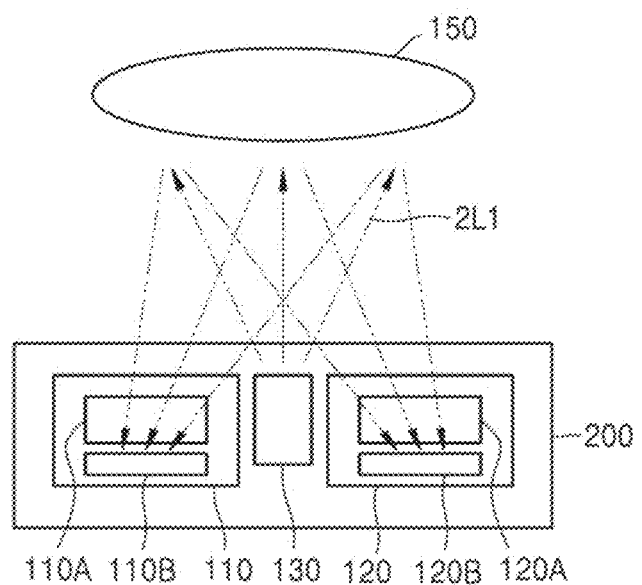
FIG. 2 is a cross-sectional view of a dual camera module including a hyperspectral camera module according to another example embodiment.

FIG. 2 is a cross-sectional view of a dual camera module 200 including a hyperspectral camera module according to another example embodiment. Only descriptions different from the dual camera module 100 of FIG. 1 will be given.

Referring to FIG. 2, the first light source 130 is disposed between the first camera module 110 and the second camera module 120.

Figure 3:
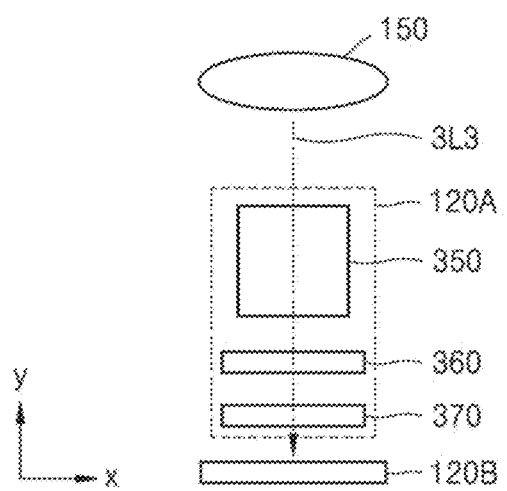
FIG. 3 is a cross-sectional view of an example of an optical guide module of the hyperspectral camera modules of FIGS. 1 and 2.

FIG. 3 shows an example of a configuration of the second optical guide module 120A of the second camera module 120 of FIG. 1 or 2.

Referring to FIG. 3, the second optical guide module 120A may include a hyperspectral filter 370, a low pass filter 360, and a lens system 350 sequentially stacked on the second image sensor 120B and may further include other optical members. The hyperspectral filter 370 may include a plurality of pixels for hyperspectral filtering, and each pixel may include a plurality of channels. The low pass filter 360 passes a wavelength shorter than a specific wavelength and blocks a wavelength longer than the specific wavelength. The low pass filter 360 may be, for example, a filter that blocks near infrared (NIR). As light 3L3 incident from the subject 150 passes through the hyperspectral filter 370, a hyperspectral image of the subject 150 is recorded in the second image sensor 120B. The lens system 350 collects the light 3L3 incident from the subject 150. The lens system 350 may include a single lens or a plurality of lenses.

Figure 4:
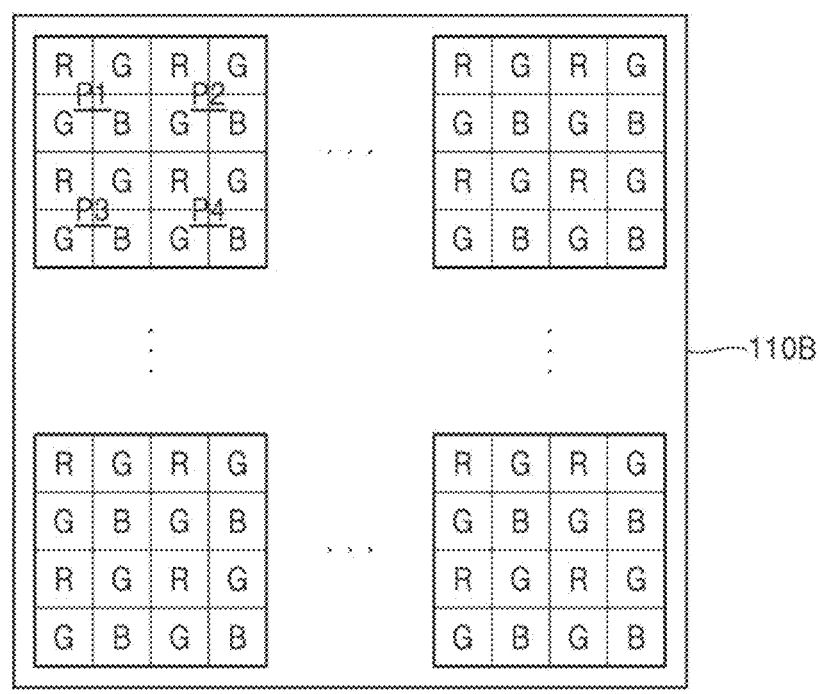
FIG. 4 is a plan view of a pixel distribution of an image sensor of an RGB camera modules of FIGS. 1 and 2.
Figure 5:
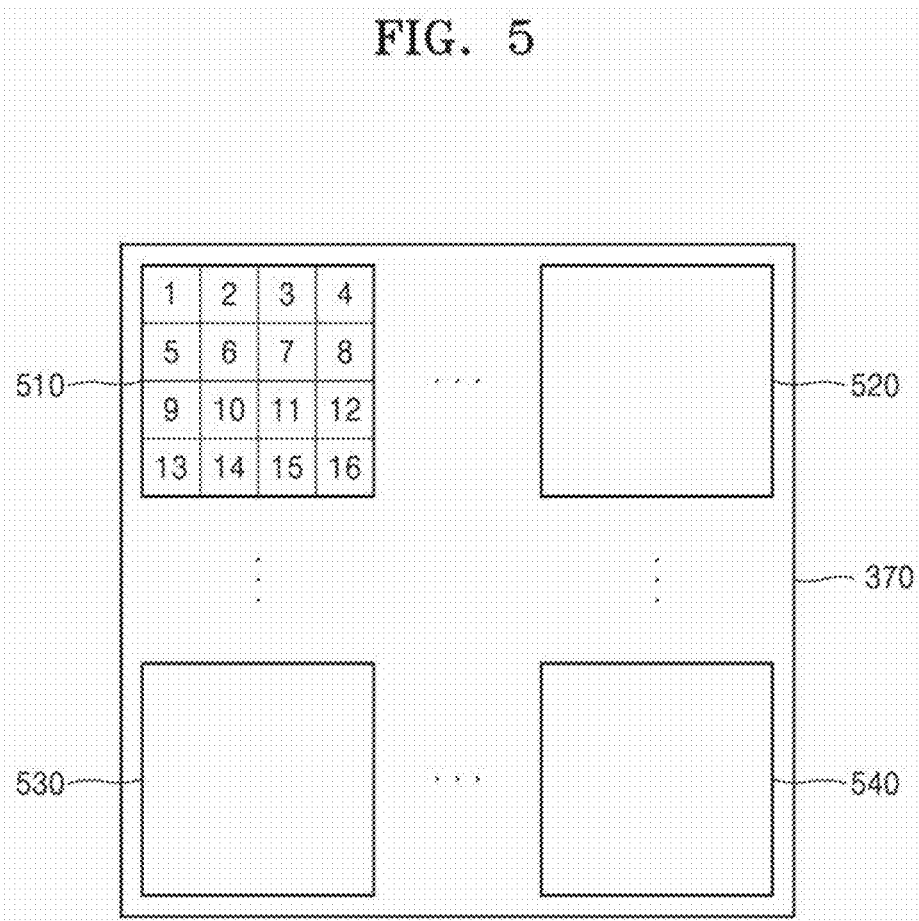
FIG. 5 is a plan view of an example of a hyperspectral filter of FIG. 3.

FIG. 4 shows an example of the first image sensor 110B of the RGB camera module 110 shown in FIG. 1 or 2. The first image sensor 110B may include a plurality of pixels (e.g., pixels P1 to P4). As shown in FIG. 4, each pixel may include a plurality of sub-pixels. FIG. 5 shows an example of the hyperspectral filter 370 of FIG. 3. The hyperspectral filter 370 includes a plurality of pixels 510, 520, 530, and 540.

Referring to FIGS. 4 and 5, the four pixels P1 to P4 of the first image sensor 110B of the RGB camera module 110 may together correspond to one pixel 510 of the hyperspectral filter 370 of the hyperspectral camera module 120, which is one of several examples. One pixel of the hyperspectral filter 370 of the hyperspectral camera module 120 may correspond to a plurality of pixels of the first image sensor 110B of the RGB camera module 110, and as an example, as described above, the four pixels P1 to P4 of the first image sensor 110B of the RGB camera module 110 may correspond to one pixel 510 of the hyperspectral filter 370 of the hyperspectral camera module 120. In another example, three, six, eight, or ten pixels of the RGB camera module 110 may correspond to one pixel of the hyperspectral camera module 120. One pixel 510 of the hyperspectral filter 370 of the hyperspectral camera module 120 includes a plurality of channels 1 to 16, which is merely an example. Each of a plurality of pixels 510, 520, 530, and 540 included in the hyperspectral filter 370 may include 10 or more channels, and may include, for example, more than several tens to hundreds of channels. Light that may pass through the plurality of channels 1 to 16 included in one pixel 510 of the hyperspectral filter 370 may be different from each other. That is, each channel shows relatively large transmittance only for light of a specific wavelength (or light of a specific wavelength band), and thus, light that may pass through each channel may be specified, and light that may pass through each channel may be different from each other. As a result, one pixel 510 of the hyperspectral filter 370 may divide incident light into light having different wavelengths according to the number of channels included in the pixel. In other words, light incident on one pixel 510 of the hyperspectral filter 370 may be divided by the number of channels of the pixel.

Each pixel (e.g., pixel P1) included in the first image sensor 110B of the RGB camera module 110 includes four sub-pixels (one R, one B, and two Gs), but it may be said that each pixel of an RGB camera includes three channels in that three sub-pixels among the four sub-pixels respectively transmit only light of a specific wavelength different from each other. In other words, light incident on each pixel of the RGB camera is divided into light having three different wavelengths. In this regard, it may be said that each pixel of the RGB camera includes three spectral channels. As described below, each pixel of the RGB camera module 110 may include six sub-pixels, and, in this case, each pixel includes six spectral channels.

Figure 6:
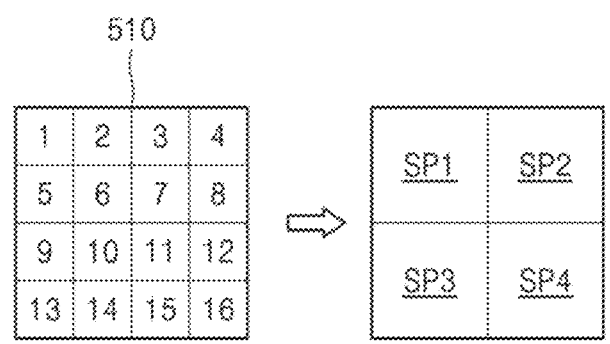
FIG. 6 is a plan view showing a correspondence relationship between channels included in a unit pixel of the hyperspectral filter of FIG. 5 and virtual spectral pixels.

For convenience of explanation, it is regarded that the four pixels P1 to P4 of the first image sensor 110B of the RGB camera module 110 together correspond to one pixel 510 of the hyperspectral filter 370 of the hyperspectral camera module 120 and one pixel 510 of the hyperspectral filter 370 includes 16 channels 1 to 16. Each of the 16 channels 1 to 16 may be viewed as a sub-pixel performing a function equivalent to a sub-pixel of a unit pixel (for example, P1) of the first image sensor 110B of the RGB camera module 110. A total area of the first to fourth pixels P1 to P4 of the first image sensor 110B of the RGB camera module 110 may correspond to an area of one pixel 510 of the hyperspectral filter 370. According to this correspondence, as shown in FIG. 6, one pixel 510 of the hyperspectral filter 370 may be divided into four virtual spectral pixels SP1 to SP4. In other words, it may be regarded that one pixel 510 of the hyperspectral filter 370 includes the first to fourth spectral pixels SP1 to SP4. The first to fourth spectral pixels SP1 to SP4 may correspond to the first to fourth pixels P1 to P4 of the RGB camera module 110. As a result, the first pixel P1 of the RGB camera module 110 may correspond to the first spectral pixel SP1, that is, first, second, fifth, and sixth channels 1, 2, 5, and 6 of one pixel 510 of the hyperspectral filter 370 as shown in FIG. 6. The second pixel P2 of the first image sensor 110B of the RGB camera module 110 may correspond to the second spectral pixel SP2, that is, third, fourth, seventh, and eighth channels 3, 4, 7, and 8 of one pixel 510 of the hyperspectral filter 370. The third pixel P3 of the first image sensor 100B of the RGB camera module 110 may correspond to the third spectral pixel SP3, that is, ninth, tenth, thirteenth, and fourteenth channels 9, 10, 13, and 14 of one pixel 510 of the hyperspectral filter 370. The fourth pixel P4 of the first image sensor 110B of the RGB camera module 110 may correspond to the fourth spectral pixel SP4, that is, eleventh, twelfth, fifteenth, and sixteenth channels 11, 12, 15, and 16 of one pixel 510 of the hyperspectral filter 370. The correspondence may vary depending on the numbers assigned to the channels 1 to 16 of one pixel 510 of the hyperspectral filter 370. The above-described correspondence may be extended to all pixels of the RGB camera module 110 and all pixels included in the hyperspectral filter 370 of the hyperspectral camera module 120.

As described above, the first to fourth pixels P1 to P4 of the RGB camera module 110 and the first to fourth spectral pixels SP1 to SP4 of the hyperspectral filter 370 may correspond to each other in position or area, and although not reaching the spectral characteristic of the hyperspectral filter 370, the first to fourth pixels P1 to P4 of the RGB camera module 110 may also be regarded as having a spectral characteristic in a narrow sense, and thus, information obtained from spectral characteristics of an image acquired through the first to fourth pixels P1 to P4 of the RGB camera module 110 may be used for increasing the resolution of a hyperspectral image obtained through the hyperspectral camera 120, which will be described later.

Figure 7:
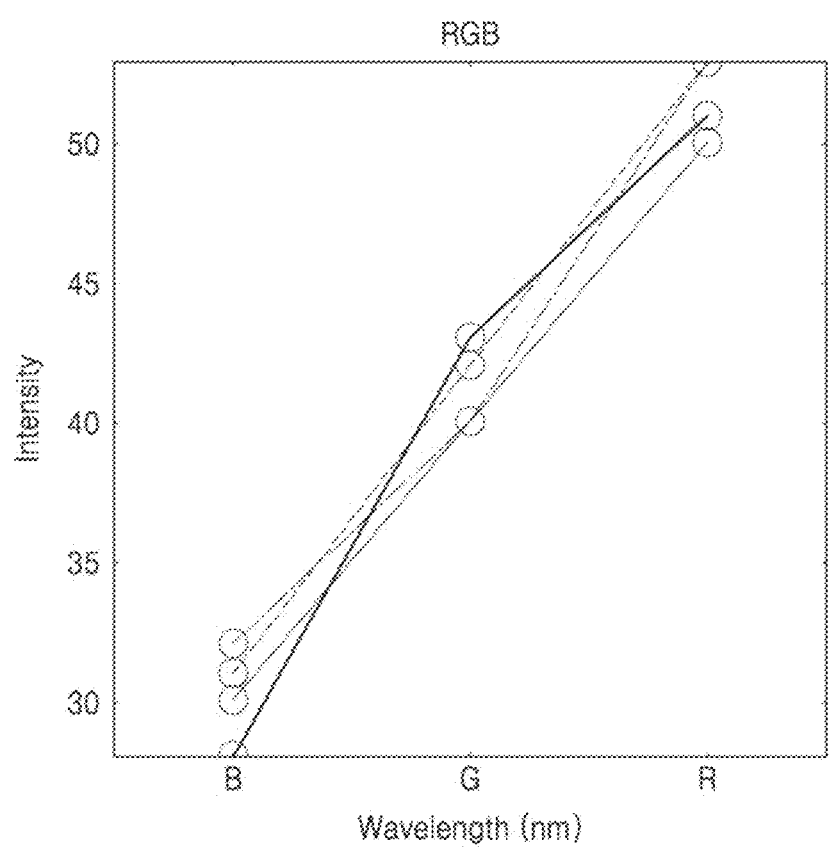
FIG. 7 is a graph showing an example of RGB spectral characteristics of first to fourth pixels P1 to P4 of the RGB camera module of FIG. 4.

FIG. 7 shows an example of intensity distributions of R, G, and B of the first to fourth pixels P1 to P4 of the RGB camera module 110 for an example image.

Referring to FIG. 7, the R, G, and B intensity distributions of the first to fourth pixels P1 to P4 are different from each other. Based on the intensity distributions, R, G, and B average values (hereinafter, referred to as first average values) of all of the first to fourth pixels P1 to P4 may be obtained, and a difference between the first average value and R, G, and B of each of the first to fourth pixels P1 to P4, that is, a deviation may be obtained. Specifically, R values for each of the first to fourth pixels P1 to P4 may be averaged to obtain a first average R value, G values for each of the first to fourth pixels P1 to P4 may be averaged to obtain a first average G value, and B values for each of the first to fourth pixels P1 to P4 may be averaged to obtain a first average B value. First deviations Δ1 between the respective first average R, G, and B values and R, G, and B values of the first pixel P1 may be obtained, and second deviations Δ2 between the respective first average R, G, and B values and respective R, G, and B values of the second pixel P2 may be obtained. Also, third deviations Δ3 between the respective first average R, G, and B values and respective R, G, and B values of the third pixel P3 may be obtained, and fourth deviations Δ4 between the respective first average R, G, and B values and R, G, and B values of the fourth pixel P4 may be obtained. As described below, the first to fourth deviations Δ1, Δ2, Δ3, and Δ4 may be used to correct a hyperspectral image.

Figure 8:
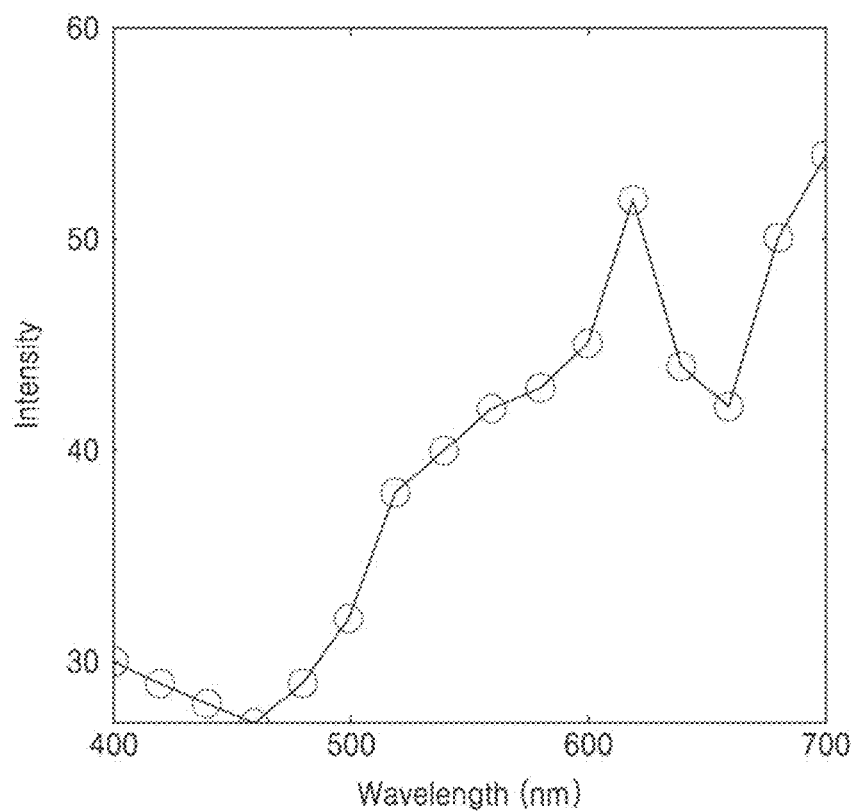
FIG. 8 is a graph showing an example of a spectrum obtained through channels included in a unit pixel of the hyperspectral filter of FIG. 5.

FIG. 8 shows an example of a hyperspectral spectrum with respect to the same example image having the R, G, and B distributions of FIG. 7. Referring to FIG. 8, it may be seen that the hyperspectral spectrum spans the entire visible light band.

Figure 9:
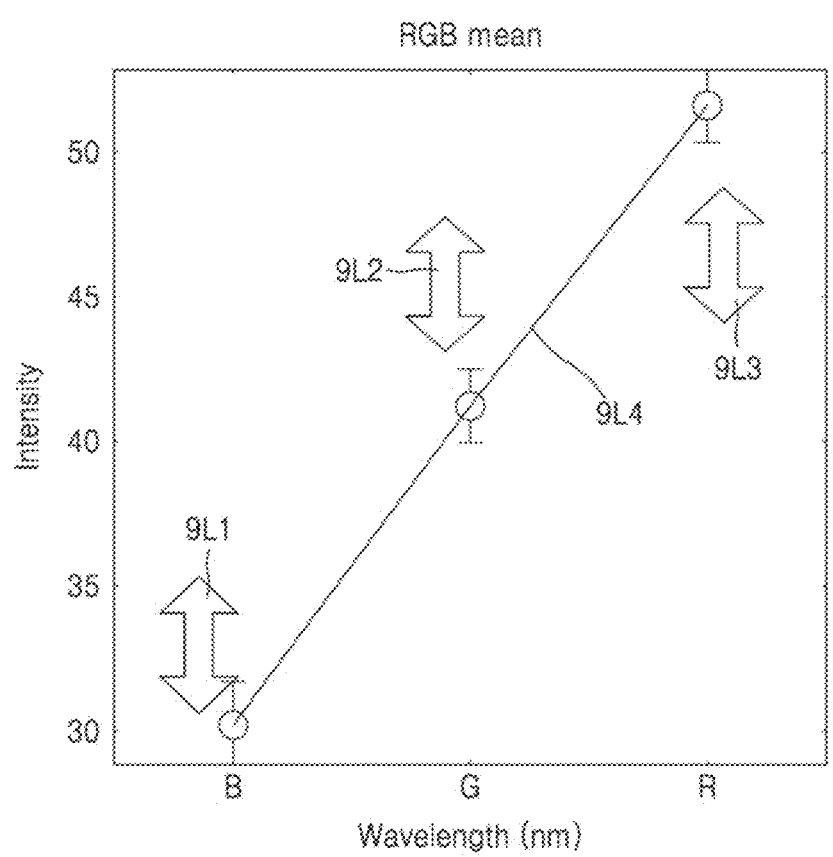
FIG. 9 is a graph showing a deviation range of R, G, and B of four virtual spectral pixels corresponding to unit pixels of the hyperspectral filter of FIG. 6, and RGB average values and deviations of four pixels of an RGB camera module representing RGB spectral characteristics of FIG. 7.

A hyperspectral image based on the hyperspectral spectrum of FIG. 8 may be obtained through the first to fourth virtual spectral pixels SP1 to SP4. FIG. 9 shows deviations of R, G and B values with respect to the first to fourth spectral pixels SP1 to SP4 when the hyperspectral image is obtained.

R, G, and B values of each of the first to fourth spectral pixels SP1 to SP4 may be obtained based on the obtained hyperspectral image. Accordingly, R, G, and B average values (second average values) with respect to all of the first to fourth spectral pixels SP1 to SP4 may be obtained. Specifically, R values for each of the first to fourth spectral pixels SP1 to SP4 may be averaged to obtain a second average R value, G values for each of the first to fourth spectral pixels SP1 to SP4 may be averaged to obtain a second average G value, and B values for each of the first to fourth spectral pixels SP1 to SP4 may be averaged to obtain a second average B value. The second average value may become the R, G, and B average values of the first pixel of a hyperspectral filter. The second average value may include an R average value, a G average value, and a B average value.

In FIG. 9, a first section 9L1 representing the variation in blue light B represents a variation range of the B value, that is, a B value deviation range of the first to fourth spectral pixels SP1 to SP4 with the first average B value as the center. A second section 9L2 representing the variation in green light G represents the variation range of the G value, that is, a G value deviation range of the first to fourth spectral pixels SP1 to SP4 with the first average G value as the center. A third section 9L3 represents the variation range of the R value, that is, an R value deviation range of the first to fourth spectral pixels SP1 to SP4 with the first average R value as the center. In FIG. 9, reference numeral 9L4 represents the first average R, G, and B values.

Correction of an image obtained through the first to fourth spectral pixels SP1 to SP4, that is, correction of a hyperspectral image obtained based on the hyperspectral spectrum of FIG. 8 may be performed as follows.

For example, a sum of the second average values and the first deviations Δ1 mentioned in the description of FIG. 7 may be calculated as corrected R, G, and B values of the first spectral pixel SP1. Also, a sum of the second average values and the second deviations Δ2 may be calculated as corrected R, G, and B values of the second spectral pixel SP2. Also, a sum of the second average values and the third deviations Δ3 may be calculated as corrected R, G, and B values of the third spectral pixel SP3, and a sum of the second average values and the fourth deviations Δ4 may be calculated as corrected R, G, and B values of the fourth spectral pixel SP4. In this way, corrected R, G, and B values for the first to fourth spectral pixels SP1 to SP4 may be obtained. The corrected R, G, and B values with respect to the first to fourth spectral pixels SP1 to SP4 thus obtained may be, as a result, a corrected image of a hyperspectral image obtained through the first to fourth spectral pixels SP1 to SP4, that is, a corrected image with respect to the hyperspectral image based on the hyperspectral spectrum of FIG. 8.

Figure 10:
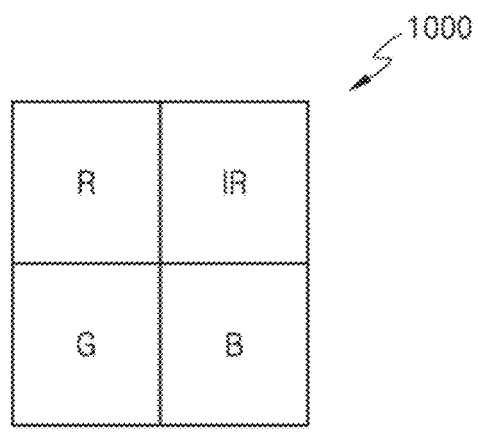
FIG. 10 is a plan view showing a case in which pixels of the RGB camera modules of FIGS. 1 and 2 are configured with four different sub-pixels R, G, B, and IR.

The configuration of a sub-pixel of each pixel included in the first image sensor 110B of the RGB camera module 110 may vary. For example, as illustrated in FIG. 10, a unit pixel 1000 included in the first image sensor 110B may be configured of first to fourth sub-pixels R, G, B, and IR different from each other. The first to third sub-pixels R, G, and B may be sub-pixels having relatively high transmittances for red light, green light, and blue light, respectively, and the fourth sub-pixel IR may be a sub-pixel having a relatively high transmittance for infrared light. Therefore, an image that uses red light, green light, blue light, and infrared light as main light may be obtained through the first image sensor 110B. In the case when the sub-pixel configuration of a unit pixel of the first image sensor 110B is to be used to detect infrared rays, since the hyperspectral camera module 120 should also be configured to receive infrared rays, the low pass filter 360 may be omitted from the hyperspectral camera module 120.

Figure 11:
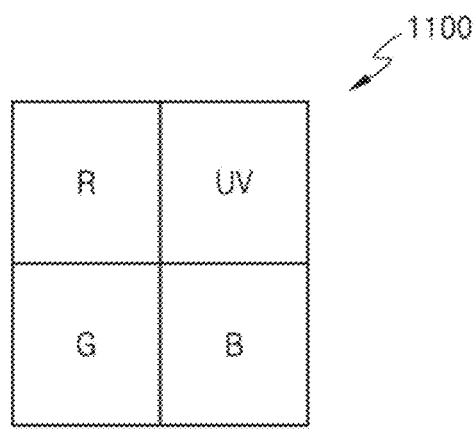
FIG. 11 is a plan view showing a case in which pixels of the RGB camera modules of FIGS. 1 and 2 are configured with four different sub-pixels R, G, B, and UV.

As another example, as illustrated in FIG. 11, the unit pixel 1100 included in the first image sensor 110B may include first to fourth sub-pixels R, G, B, and UV different from those of FIG. 10. The first to third sub-pixels R, G, and B of FIG. 11 may be the same as those of FIG. 10. The fourth sub-pixel UV of FIG. 11 may be a sub-pixel having a relatively high transmittance to UV light. In the case of FIG. 11, an image that uses red light, green light, blue light, and UV light as main light may be obtained through the first image sensor 110B.

Figure 12:
FIG. 12 is a plan view showing a case in which pixels of the RGB camera modules of FIGS. 1 and 2 are configured with six sub-pixels UV, R, G1, IR, G2, and B.

As another example, as illustrated in FIG. 12, a unit pixel 1200 included in the first image sensor 110B includes six sub-pixels, that is, first to sixth sub-pixels UV, R, G1, IR, G2, and B. The first sub-pixel UV is a sub-pixel having a relatively high transmittance with respect to UV light, the second sub-pixel R is a sub-pixel having a relatively high transmittance with respect to red light, and the third and fifth sub-pixels G1 and G2 are sub-pixels having a relatively high transmittance with respect to green light. The third and fifth sub-pixels G1 and G2 may be the same sub-pixels in terms of materials and/or optical properties. Dividing the sub-pixels for the green light into the third and fifth sub-pixels G1 and G2 is for convenience of explanation. The fourth sub-pixel IR is a sub-pixel having a relatively high transmittance with respect to infrared light. As a result, when the unit pixel of the first image sensor 110B of the RGB camera module 110 is the unit pixel 1200 of FIG. 12, an image obtained by the RGB camera module 110 is formed by using red light, green light, blue light, infrared light, and UV light as main light.

When the first image sensor 110B of the RGB camera module 110 of the dual camera module 100 according to an example embodiment includes the unit pixel 1200 illustrated in FIG. 12, the application field of the dual camera module 100 may be extended to a visible light band, an infrared band, and an UV band. For this purpose, infrared light should be incident on the hyperspectral filter 370 of the hyperspectral camera module 120, and thus, the low pass filter 360 disposed between the hyperspectral filter 370 and the lens system 350 may be omitted.

As described above, the application field of the dual camera modules 100 and 200 may be extended to outside the visible light band by varying the configuration of the unit pixels of the first image sensor 110B of the RGB camera module 110. In this case, one of the channels 1 to 16 included in the unit pixel 510 of the hyperspectral filter 370 may be an infrared channel or a UV channel. In another example, the unit pixel 510 of the hyperspectral filter 370 may include a separate channel to be used as an infrared channel and/or a separate channel to be used as a UV channel.

Figure 13:
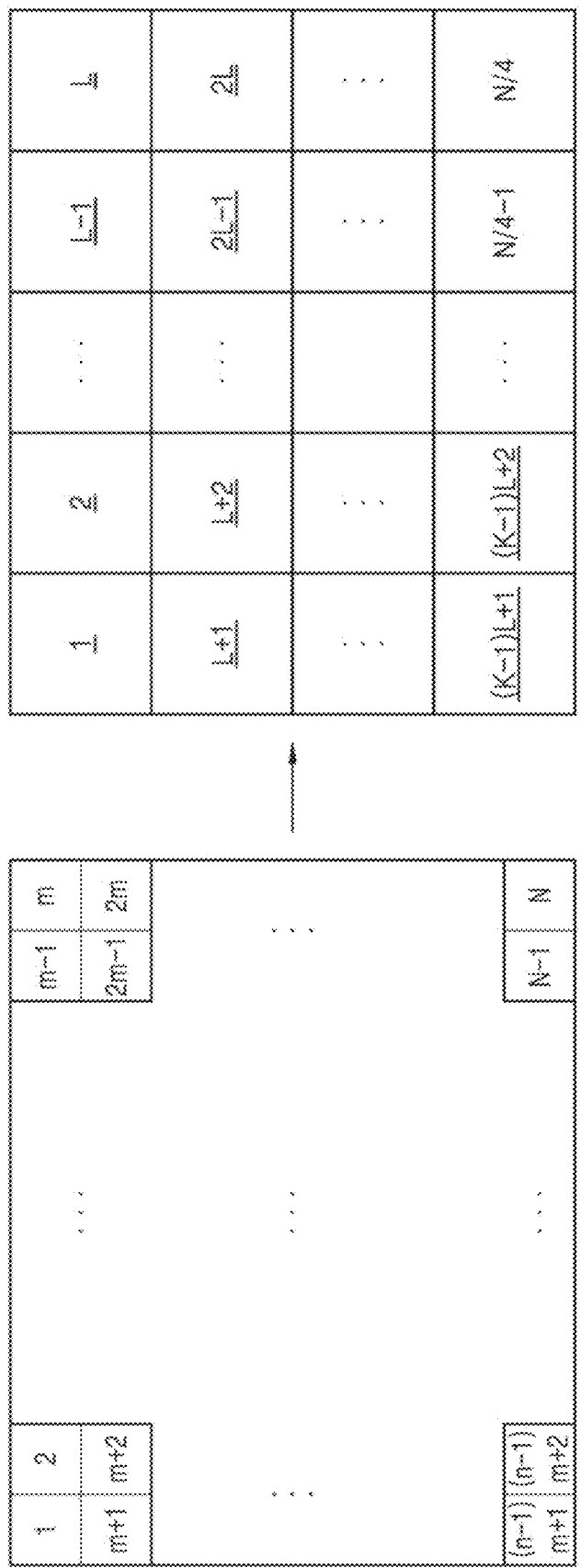
FIG. 13 is a plan view showing a plurality of virtual spectral pixels corresponding to N channels, as an example of a unit pixel of the hyperspectral filter of FIG. 3, when the unit pixel includes the N channels and a unit pixel of an RGB camera is configured with four sub-pixels.

FIG. 13 shows a virtual spectral pixel corresponding to the unit pixels 510 of the hyperspectral filter 370 when the unit pixels 510 of the hyperspectral filter 370 of the dual camera modules 100 and 200 according to an example embodiment include N channels arranged in an n×m array and a unit pixel of the first image sensor 110B of the RGB camera module 110 includes four sub-pixels. In FIG. 13, N>m>L and L, m, and n are positive integers greater than two.

In FIG. 13, the left side shows a case in which the unit pixel 510 of the hyperspectral filter 370 includes N channels, and the right side shows virtual spectral pixels arranged in a K×L array corresponding to the N channels.

As shown in FIG. 13, the number of spectral pixels corresponding to the unit pixel 510 including N channels is N/4. Accordingly, the unit pixel 510 including the N channels of the hyperspectral filter 370 may correspond to N/4 among the plurality of pixels included in the first image sensor 110B of the RGB camera module 110. Since the number N of channels included in the unit pixels of the hyperspectral filter 370 is several dozen or more, one pixel 510 included in the hyperspectral filter 370 may correspond to a plurality of pixels among pixels included in the first image sensor 110B of the RGB camera module 110. Accordingly, the image resolution of the RGB camera module 110 is greater than the resolution of the hyperspectral image obtained through the hyperspectral camera module 120. Therefore, the resolution of a hyperspectral image obtained through the hyperspectral camera module 120 may be increased by applying an image processing technique (for example, an image correction technique) of the RGB camera module 110, which provides a relatively high resolution, to the hyperspectral camera module 120.

Figure 14:
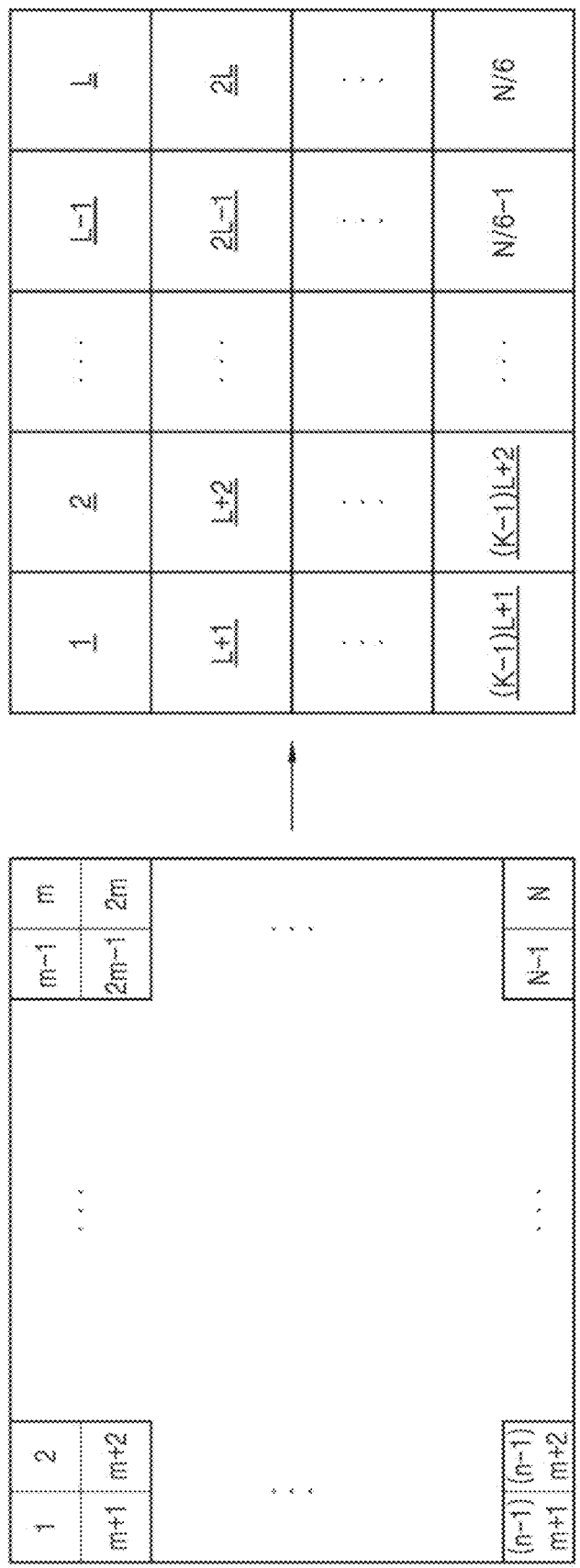
FIG. 14 is a plan view showing a plurality of virtual spectral pixels corresponding to N channels, as an example of a unit pixel of the hyperspectral filter of FIG. 3, when the unit pixel includes the N channels and a unit pixel of an RGB camera is configured with six sub-pixels.

FIG. 14 shows a virtual spectral pixel corresponding to the unit pixel 510 of the hyperspectral filter 370 when the unit pixel 510 of the hyperspectral filter 370 of the dual camera modules 100 and 200 according to an example embodiment includes N channels arranged in an n×m array and a unit pixel of the first image sensor 110B of the RGB camera module 110 includes six sub-pixels as depicted in FIG. 12.

Referring to FIG. 14, when the unit pixels 510 of the hyperspectral filter 370 include N channels 1 through N, and the unit pixels of the first image sensor 110B of the RGB camera module 110 include six sub-pixels, the number of spectral pixels corresponding to the unit pixels 510 is N/6.

Figure 15:
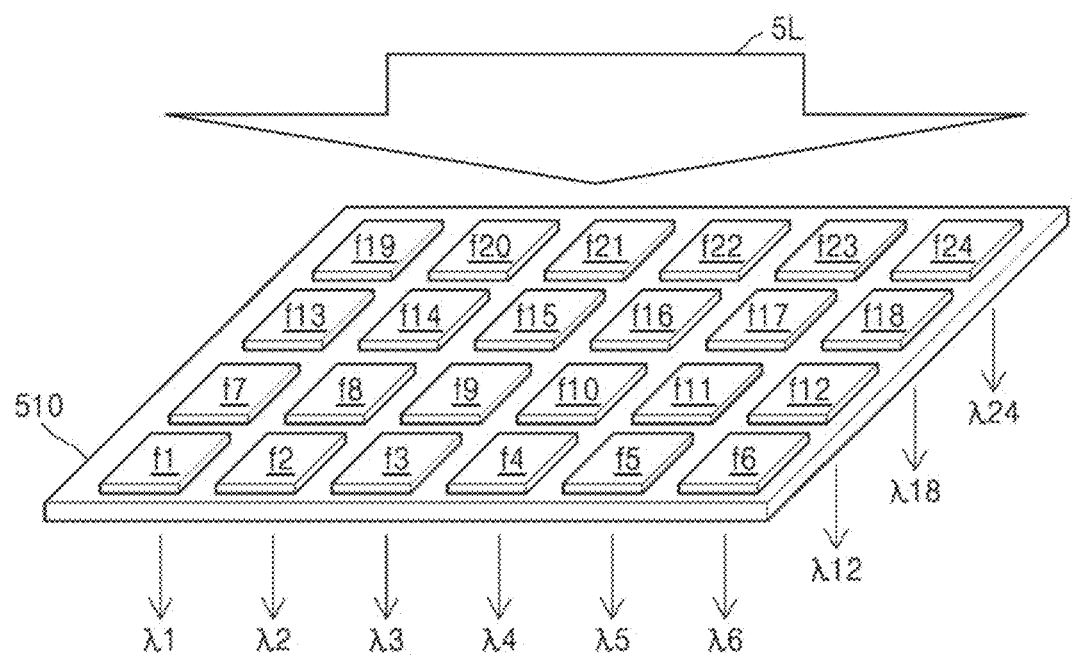
FIG. 15 is a perspective view of a unit pixel of the hyperspectral filter of FIG. 5.

FIG. 15 is a perspective view of an example of the hyperspectral filter 370.

Referring to FIG. 15, the unit pixel 510 of the hyperspectral filter 370 includes a plurality of channels, that is, first to twenty-fourth channels f1 to f24. The plurality of channels f1 to f24 may be a plurality of filter regions. For convenience of description, the hyperspectral filter 370 is illustrated as including the first to twenty-fourth channels f1 to f24, but may include more or fewer than 24 channels. Light 5L incident on the hyperspectral filter 370 includes a plurality of light components. In other words, the light 5L includes light of a plurality of wavelengths. Each of the first to twenty-fourth channels f1 to f24 of the hyperspectral filter 370 may have a layer structure through which only a light component having a specific wavelength may pass. Light filtering characteristics of the first to twenty-fourth channels f1 to f24 included in the hyperspectral filter 370 may all be different from each other. Therefore, the light 5L incident on the hyperspectral filter 370 may be divided into light having 24 different wavelengths while passing through the hyperspectral filter 370. For example, light of first to sixth wavelengths $\lambda 1$ to $\lambda 6$ may be emitted through the first to sixth channels f1 to f6, respectively; light of a twelfth wavelength $\lambda 12$ may be emitted through the twelfth channel f12; light of an eighteenth wavelength $\lambda 18$ may be emitted through the eighteenth channel f18, and light of a twenty-fourth wavelength $\lambda 24$ may be emitted through the twenty-fourth channel f24. Since the incident light 5L is divided into wavelengths by the hyperspectral filter 370 as described above, an image of each wavelength included in the incident light 5L may be recorded in the second image sensor 120B. That is, a hyperspectral image may be recorded in the second image sensor 120B. Since the incident light 5L is light reflected from the subject 150, as a result, a hyperspectral image of the subject 150 is recorded in the second image sensor 120B.

Figure 16:
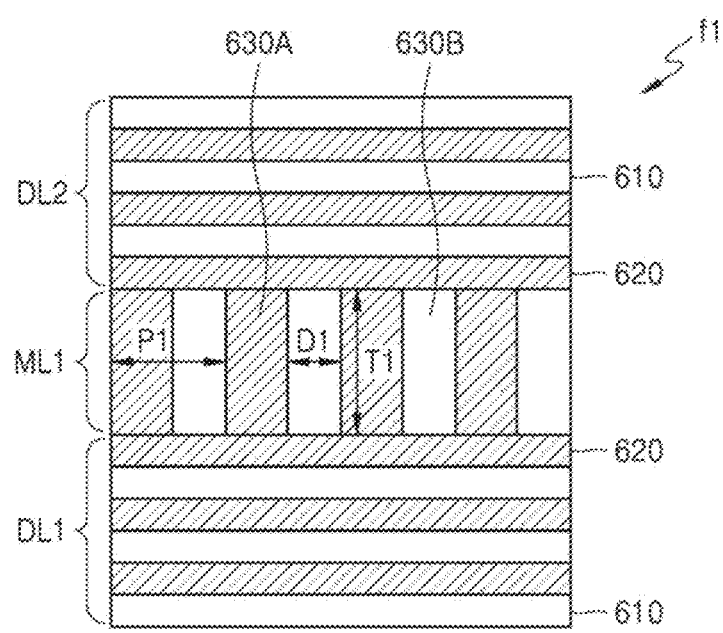
FIG. 16 is a cross-sectional view of a first channel of a unit pixel of FIG. 15.

FIG. 16 is a cross-sectional view of an example of a configuration of any one (e.g., the first channel f1) of the first to twenty-fourth channels f1 to f24 included in the unit pixel 510 of FIG. 15.

Referring to FIG. 16, the first channel f1 includes a first reflective layer DL1, a resonance layer ML1, and a second reflective layer DL2 that are sequentially stacked. The first reflective layer DL1, the resonance layer ML1, and the second reflective layer DL2 may form a resonance cavity. In the resonance layer ML1, a first material layer 630A and a second material layer 630B are alternately and horizontally arranged, and a resonance mode may vary according to a pitch P1 of the first and second material layers 630A and 630B and a distance D1 between the first material layers 630A. That is, a wavelength at which a resonance occurs in the resonance layer ML1 may vary according to the pitch P1 of the first and second material layers 630A and 630B and/or the distance D1 between the first material layers 630A. A thickness T1 of the resonance layer ML1 may also affect the resonance. Accordingly, a wavelength passing through the first channel f1 may be varied by changing the pitch P1 of the first and second material layers 630A and 630B of the resonance layer ML1, the distance D1 between the first material layers 630A, the thickness T1 of the resonance layer ML1, or any combination of these parameters. Accordingly, at least one of the parameters (pitch, distance, and thickness) of the layer configuration of the resonance layers of the first to twenty-fourth channels f1 to f24 included in the unit filter 510 of FIG. 15 may be different from each other.

In FIG. 16, the first reflective layer DB1 may be a first distributed Bragg reflector (DBR) layer. For example, the first reflective layer DL1 includes a first layer 610 and a second layer 620 that are sequentially stacked with different refractive indices. The first and second layers 610 and 620 are alternately stacked, for example, three times. The number of alternating stacks of the first and second layers 610 and 620 may be more or less than three. The first layer 610 may be, for example, a SiO$_2$ layer or may include a SiO$_2$ layer. The second layer 620 may be, for example, a TiO$_2$ layer or may include a TiO$_2$ layer.

The second reflective layer DL2 may be a second DBR layer. For example, the second reflective layer DL2 may include the second layer 620 and the first layer 610 that have refractive indices different from each other and are sequentially stacked. The second layer 620 and the first layer 610 that are sequentially stacked are alternately stacked, for example, three times. The number of alternating stacks of the second layer 620 and the first layer 610 may be more or less than three. Therefore, both the uppermost layer of the first reflective layer DL1 and the lowermost layer of the second reflective layer DL2 may become the second layer 620. The first material layer 630A of the resonance layer ML1 may be the same material as the second layer 620 of the first and second reflective layers DL1 and DL2. The second material layer 630B may be the same material as the first layer 610 of the first and second reflective layers DL1 and DL2.

Next, in a dual camera module according to an example embodiment, an example in which precise spectral information by using a hyperspectral camera module is acquired and the resolution of a hyperspectral image is increased by using an image correction signal obtained from an RGB camera module will be described.

Figure 17:
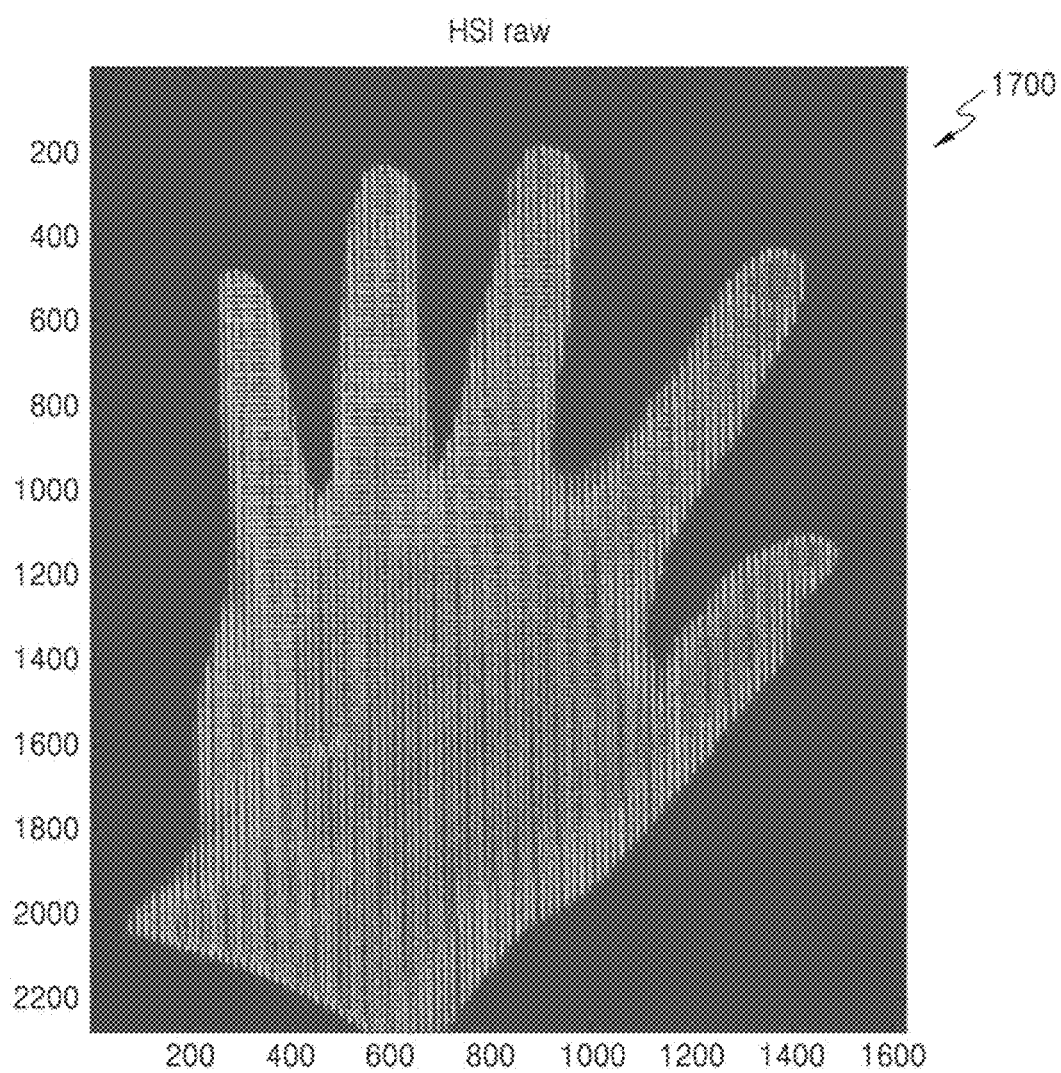
FIG. 17 is a hyperspectral photograph of a hand taken by using the hyperspectral camera module of the dual camera module of FIG. 1 or FIG. 2.

FIG. 17 is a hyperspectral photograph 1700 of a hand photographed by using the hyperspectral camera module 120 of the dual camera module 100 according to an example embodiment. The hyperspectral photograph 1700 includes image information together with spectral information (spectrum) of a hand.

Figure 18:
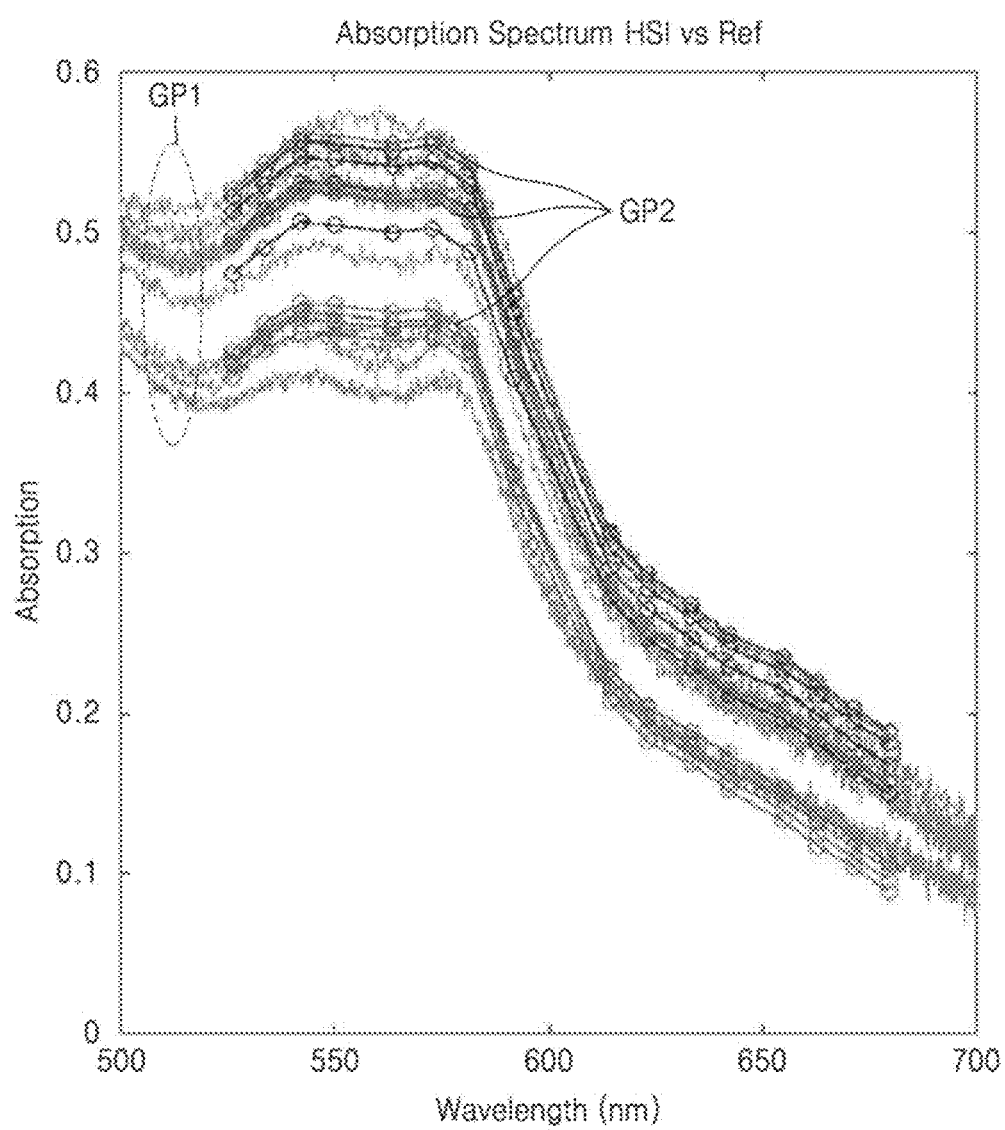
FIG. 18 is a graph showing a light absorption spectrum of a hand due to hemoglobin and melanin, which is obtained from the hyperspectral photograph of FIG. 17, superimposed with a reference spectrum.

FIG. 18 is a graph showing a light absorption spectrum of a hand due to hemoglobin and melanin, which is obtained from a hyperspectral photograph of a hand taken by using the hyperspectral camera module 120. In FIG. 18, a first graph group GP1 shows reference spectrums. A second graph group GP2 shows spectrums photographed by using the hyperspectral camera module 120.

When the first and second graph groups GP1 and GP2 are compared, it may be seen that the spectrums photographed by using the hyperspectral camera module 120 coincide well with the reference spectrums.

The hyperspectral photograph 1700 of FIG. 17 is a combination of an image and spectral information. In the case of the hyperspectral camera module 120, as the number of spectral channels included in the unit pixels of the hyperspectral filter 370 increases, the spectral accuracy or spectral resolution of the hyperspectral photograph 1700 may be improved, but the size of the hyperspectral photograph 1700 may be reduced. In other words, the image resolution of the hyperspectral photograph 1700 may be reduced as the spectral accuracy is improved.

A hyperspectral image having a further improved resolution may be obtained by applying spectral information (e.g., RGB average value, deviation, etc.) with respect to an image of a hand, the same subject, photographed by using the RGB camera module 110 to the image of the hyperspectral photograph 1700 of FIG. 17.

Figure 19:
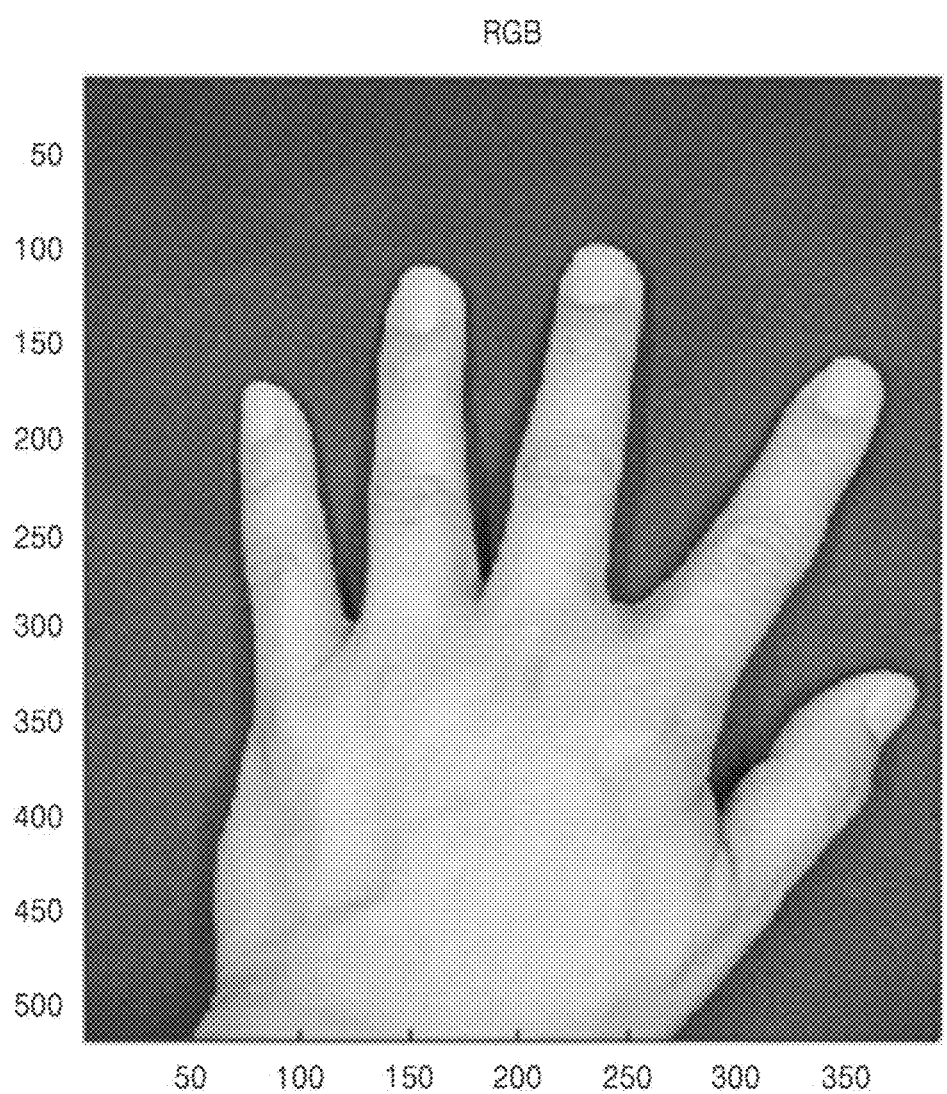
FIG. 19 is a photograph of a hand photographed using the RGB camera module of FIG. 1 or 2.

In detail, FIG. 19 is a photograph of a hand taken by using the RGB camera module 110. That is, FIG. 19 shows an RGB image of a hand.

Figure 20:
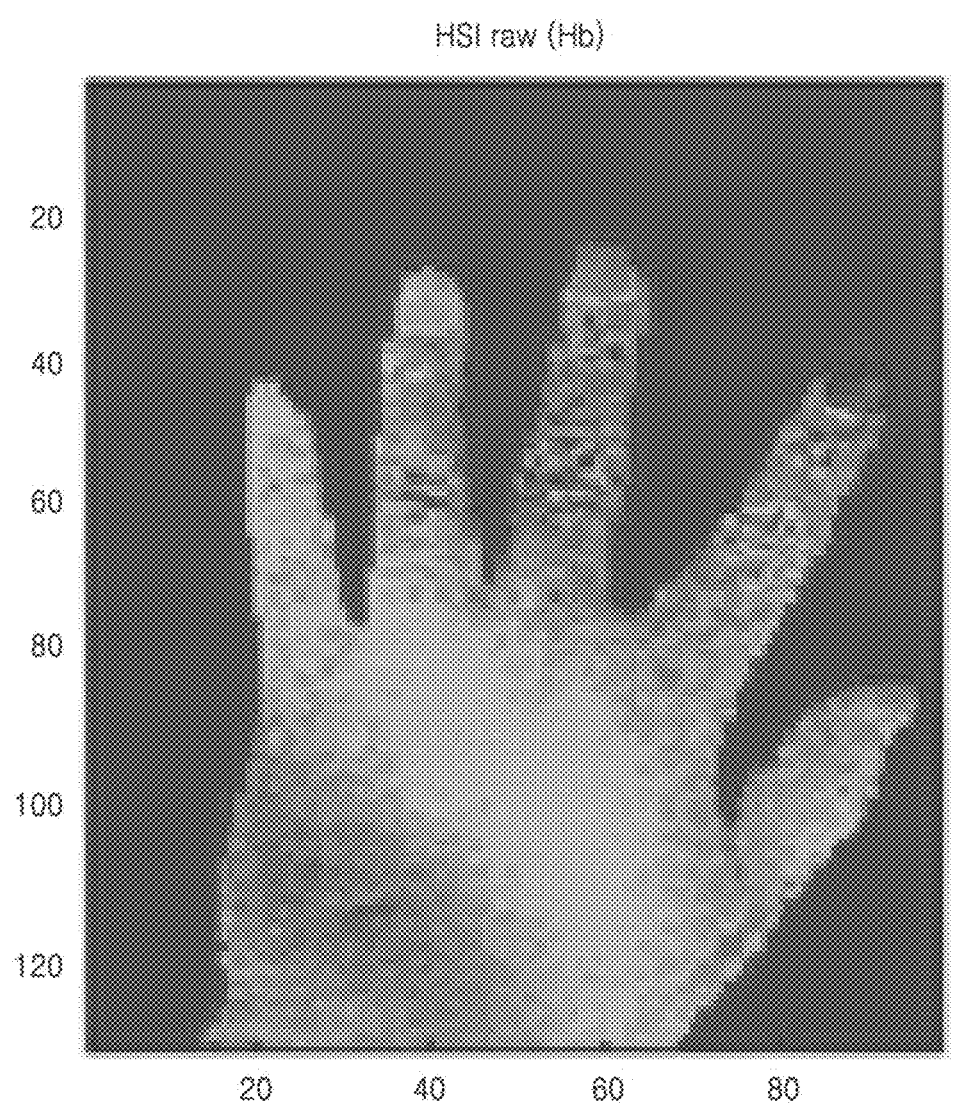
FIG. 20 is a hyperspectral photograph photographed using the hyperspectral camera module of FIG. 1 or 2 and shows spectral characteristics (light absorption characteristics) of a hand due to hemoglobin.

FIG. 20 is a hyperspectral photograph taken with the hyperspectral camera module 120 and shows spectral characteristics (light absorption characteristics) of a hand due to hemoglobin.

When FIGS. 19 and 20 are compared, it may be seen that the size of the hyperspectral image taken by using the hyperspectral camera module 120 is much smaller than that of the image taken by using the RGB camera module 110.

Figure 21:
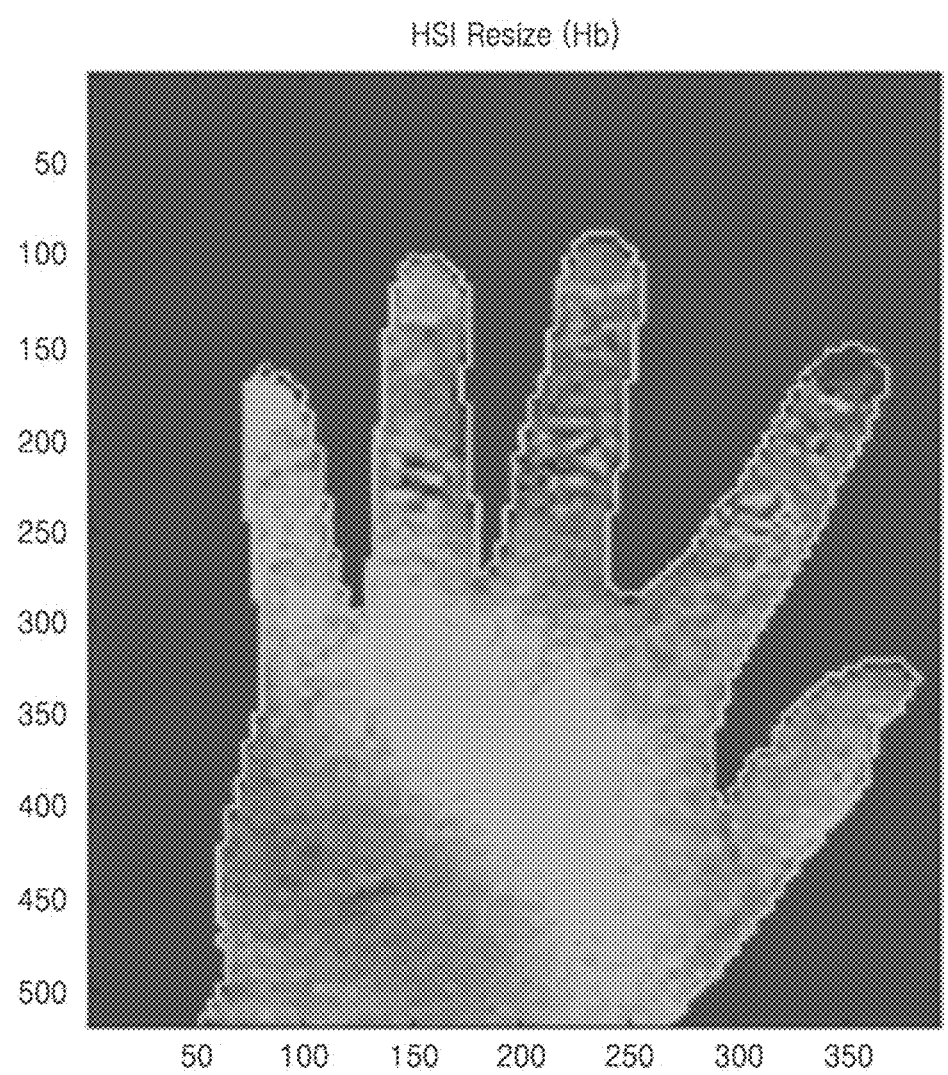
FIG. 21 is a photograph to enlarge the size of the hyperspectral image of FIG. 20 to the RGB image level of FIG. 19.

FIG. 21 shows a hyperspectral image obtained by simply enlarging the hyperspectral image of FIG. 20 to the level of the RGB image of FIG. 19. It may be seen in FIG. 21 that only the spectral information is enlarged as it is and the resolution is not improved.

Figure 22:
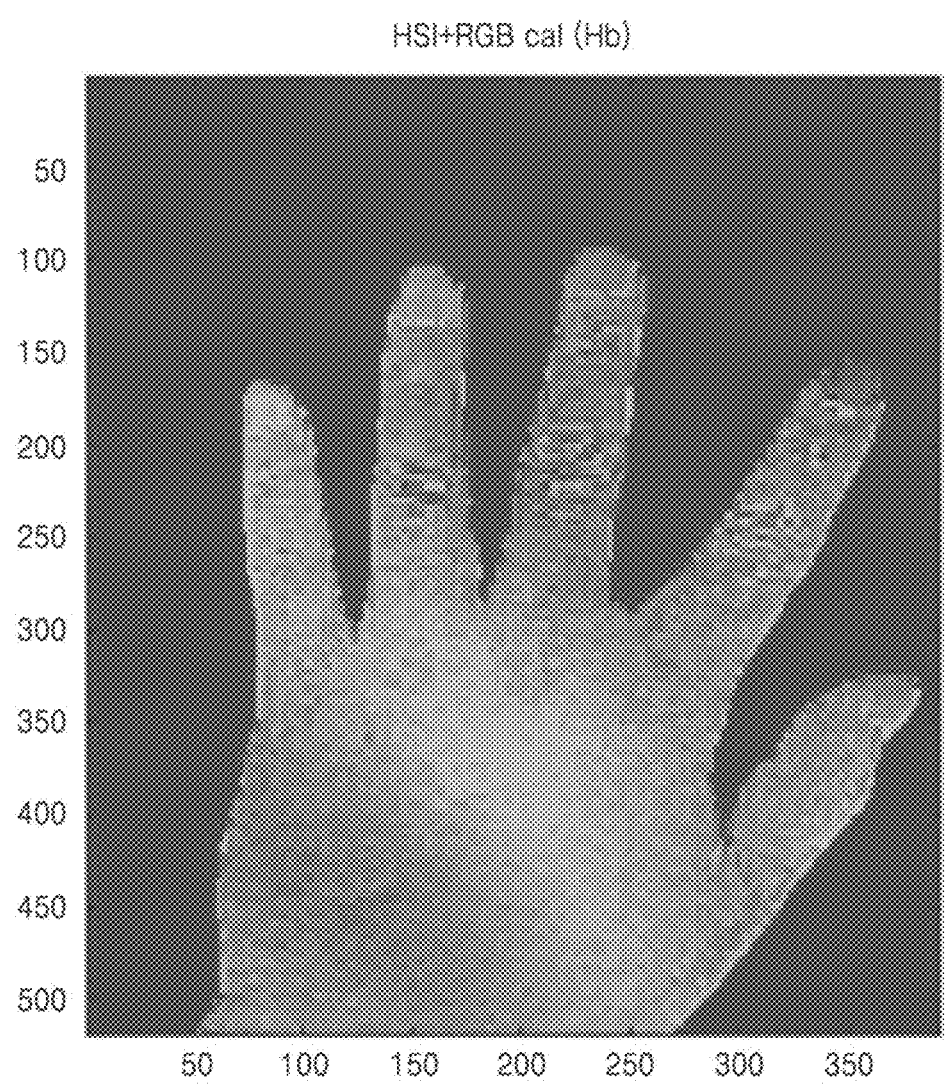
FIG. 22 shows a corrected hyperspectral image obtained as a result of applying information obtained from the spectral characteristics of the image photographed by using the RGB camera module of FIG. 1 or 2 to the hyperspectral image of FIG. 21.

FIG. 22 shows an image obtained by correcting the hyperspectral image of FIG. 21 by applying information obtained from the spectral characteristics of the image taken by using the RGB camera module 110 to the hyperspectral image of FIG. 21. When the hyperspectral image of FIG. 22 after correction is compared with the hyperspectral image of FIG. 21 before correction, it may be seen that the resolution of the hyperspectral image after correction is much higher than before correction while the spectral characteristics are generally maintained in a correction process.

The process of correcting the hyperspectral image of FIG. 21 to the hyperspectral image of FIG. 22 may be performed as follows. For example, if one pixel 510 of the hyperspectral filter 370 of FIG. 6 is used to obtain the hyperspectral image of FIG. 21, in other words, the first to fourth spectral pixels SP1 to SP4 of FIG. 6 are used, as described in detail in the descriptions of FIGS. 7 and 9, R, G, and B average values with respect to all of the first to fourth spectral pixels SP1 to SP4, that is, the second average values, are obtained, and afterwards, R, G, and B average values, that is, the first average values with respect to all of the first to fourth pixels P1 to P4 of the first image sensor 110B of the RGB camera module 110 corresponding to the first to fourth spectral pixels SP1 to SP4 are obtained, and next, the deviations between the first average value and each of the first to fourth pixels P1 to P4, that is, the first to fourth deviations $\Delta 1$, $\lambda 2$, $\lambda 3$, and $\lambda 4$, are obtained.

Next, as shown in FIG. 23, R, G, and B values of the first spectral pixel SP1 are corrected by adding a first deviation $\lambda 1$ to the second average value, R, G, and B values of the second spectral pixel SP2 are corrected by adding a second deviation $\Delta 2$ to the second average value, R, G, B values of a third spectral pixel SP3 are corrected by adding a third deviation $\Delta 3$ to the second average value, and R, G, and B values of the fourth spectral pixel SP4 are corrected by adding a fourth deviation $\Delta 4$ to the second average value.

Through the corrections, the hyperspectral image of FIG. 21 may become a hyperspectral image with much improved resolution, as shown in FIG. 22.

As a result, when the dual camera modules 100 and 200 including the hyperspectral camera according to an example embodiment are used, a hyperspectral image having a high resolution may be obtained while maintaining superior spectral characteristics (spectrum) of the hyperspectral camera.

The RGB camera module 110 and the hyperspectral camera module 120 are spatially separated from each other in the dual camera modules 100 and 200 according to an example embodiment. Next, the effects and advantages obtained by separation of the camera modules 110 and 120 will be described.

Figure 24:
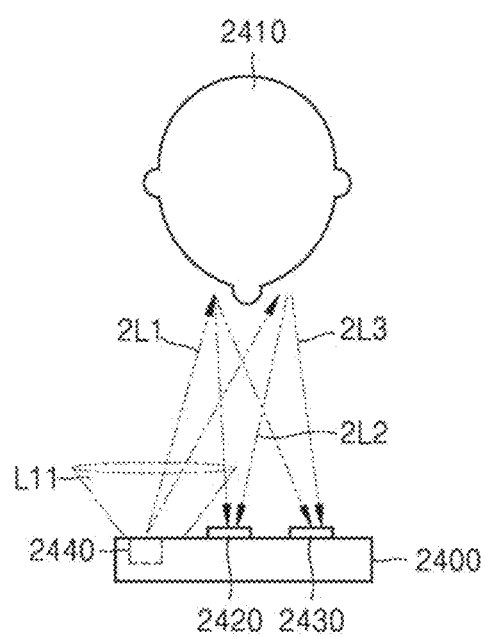
FIG. 24 is a plan view of a case in which a subject is photographed by using an apparatus on which a dual camera module according to an example embodiment is mounted.

FIG. 24 is a plan view of a case in which a subject 2410 is photographed by using an apparatus 2400 on which a dual camera module according to an example embodiment is mounted.

Referring to FIG. 24, the apparatus 2400 may be an example of a mobile device, such as a mobile phone. The apparatus 2400 includes first and second cameras 2420 and 2430 provided side by side. A light source 2440 is built in the left side of the first camera 2420. The light source 2440 may be a light source mounted in a general mobile phone. The first camera 2420 may be an RGB camera module 110 of the dual camera module 100 or 200, or a member including the RGB camera module 110. The second camera 2430 may be a hyperspectral camera module 120 of the dual camera module 100 or 200 according to an example embodiment or a member including the hyperspectral camera module 120. Among light L11 emitted from the light source 2440, light 2L1 directed toward the subject 2410 is irradiated onto a front surface of the subject 2410. The light 2L1 irradiated on the front surface of the subject 2410 is reflected and incident on the first camera 2420 and the second camera 2430. Reference numeral 2L2 denotes light reflected from the subject 2410 and incident on the first camera 2420 and reference numeral 2L3 denotes light reflected from the subject 2410 and incident on the second camera 2430. The first and second cameras 2420 and 2430 are in a lateral direction arranged side by side at a given interval. Accordingly, a viewing angle of the first camera 2420 viewing the subject 2410 may be different from a viewing angle of the second camera 2430 viewing the subject 2410. For example, the first camera 2420 may see a front center of the subject 2410, and the second camera 2430 may see a portion that is adjacent to the front center and is to the right of the front center of the subject 2410. That is, a center of the field of view of the second camera 2430 is to the right of the front center of the subject 2410 and may be close to the front center of the subject 2410. Although a viewing angle difference between the first and second cameras 2420 and 2430 viewing the subject 2410 may not be large in that the interval between the first and second cameras 2420 and 2430 is not large, due to the viewing angle difference, light 2L3 reflected from the subject 2410 and incident on the second camera 2430 may not be uniform. Also, since the subject 2410 is a three-dimensional object, the degree of non-uniformity of the light 2L3 reflected from the subject 2410 and incident on the second camera 2430 may be even greater due to the subject 2410 having a curvature and the light source 2440 being biased in one side. In this case, in the case of a hyperspectral image observed by the second camera 2430, as shown in an image (a) of FIG. 25, there may be portions where the spectral characteristics are not uniform. The non-uniform portions may be difficult to overcome with information by one camera, but it may be confirmed how much the light source 2440 is biased and/or how much the viewing angle of the second camera 2430 is biased through information obtained by the two cameras, the first and second cameras 2420 and 2430. An image (b) of FIG. 25 shows a hyperspectral image with improved uniformity. The degree of curvature of the subject 2410 may also be confirmed from combined information of an RGB image obtained from the first camera 2420 and a hyperspectral image obtained from the second camera 2430. An accurate hyperspectral image result may be provided through the corrected information.

A dual camera module according to an example embodiment may be applied to security using facial recognition.

In other words, facial recognition may be an important issue in security, but existing analysis methods may have limitation due to forgery through a photo. A hyperspectral camera may provide spectral information at the same time as information regarding the shape of a face. Accordingly, when using a hyperspectral camera, the accuracy of facial recognition may be increased. In addition to shape recognition and spectral analysis by using a hyperspectral camera, the recognition of three-dimensional curved surfaces may be increased by using an RGB camera and a hyperspectral camera, thereby further improving the accuracy of facial recognition.

Next, an electronic apparatus including a dual camera module according to an example embodiment will be described.

Figure 26:
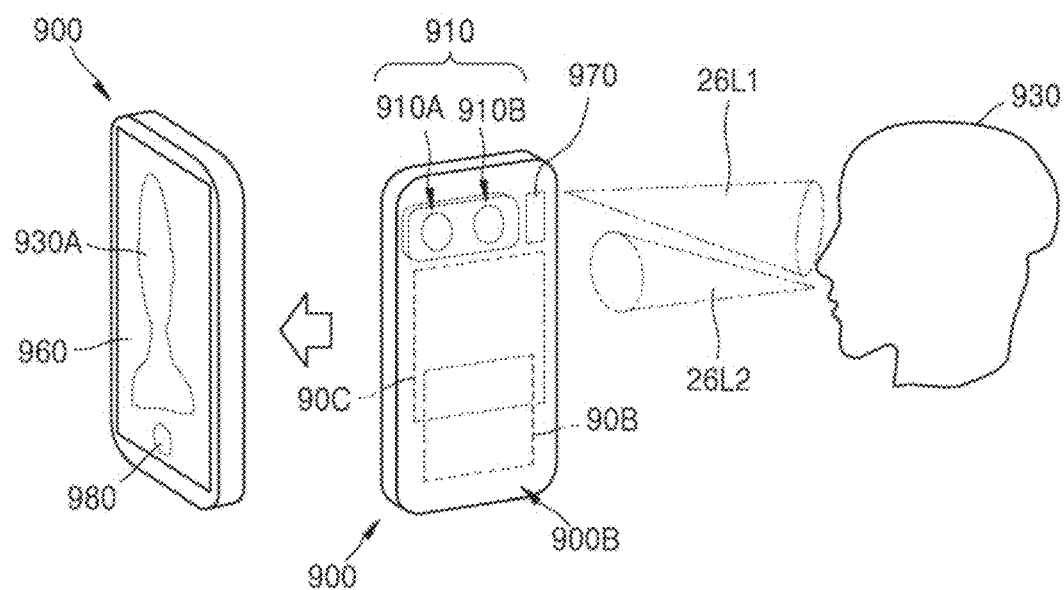
FIG. 26 is a perspective view of a mobile phone as one of electronic apparatuses including a dual camera module according to an example embodiment.

FIG. 26 shows a mobile phone 900 as one of electronic apparatuses including a dual camera module according to an example embodiment.

Referring to FIG. 26, a dual camera module 910 is mounted on a rear surface 900B of the mobile phone 900. The dual camera module 910 includes first and second camera modules 910A and 910B. A light source 970 is provided on the right side of the second camera module 910B. The light source 970 may be provided on the left side of the first camera module 910A or between the first camera module 910A and the second camera module 910B. In addition to the light source 970, a second light source may further be provided. The first camera module 910A may be the first camera module 110 of FIG. 1 or may include the first camera module 110. The second camera module 910B may be the second camera module 120 of FIG. 1 or may include the second camera module 120. The dual camera module 910 may correspond to the dual camera module 100 of FIG.

1. The light source 970 may be the first light source 130 of FIG. 1. Power required for operating the dual camera module 910 may be supplied from a battery 90B embedded in the mobile phone 900. The mobile phone 900 may include a circuit unit 90C for operation and control thereof. Operation and control of the dual camera module 910 may also be performed through the circuit unit 90C. Light 26L2 reflected from a subject 930 may be natural light reflected from the subject 930 and/or light 26L1 that is irradiated to the subject 930 from the light source 970 and then is reflected from the subject 930.

The left figure shows a front side of the mobile phone 900. The front surface includes a display region 960. A corrected hyperspectral image 930A of the subject 930 is displayed on the display region 960. The corrected hyperspectral image 930A is obtained via the dual camera module 910. In the display region 960, spectral information with respect to the corrected hyperspectral image 930A may be displayed together with the corrected hyperspectral image 930A. A hyperspectral image of the subject 930 before correction may be displayed on the display region 960 by operating a function button 980 disposed on the front side. Various functions of the mobile phone 900 may be called or be performed through the function button 980.

Figure 27:
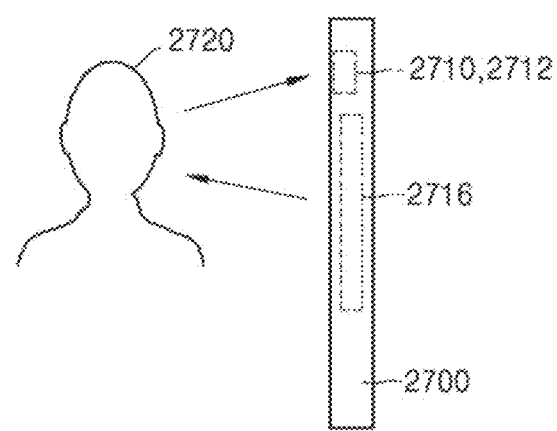
FIG. 27 is a side view of a mirror-type display apparatus including a dual camera module according to an example embodiment.
Figure 28:
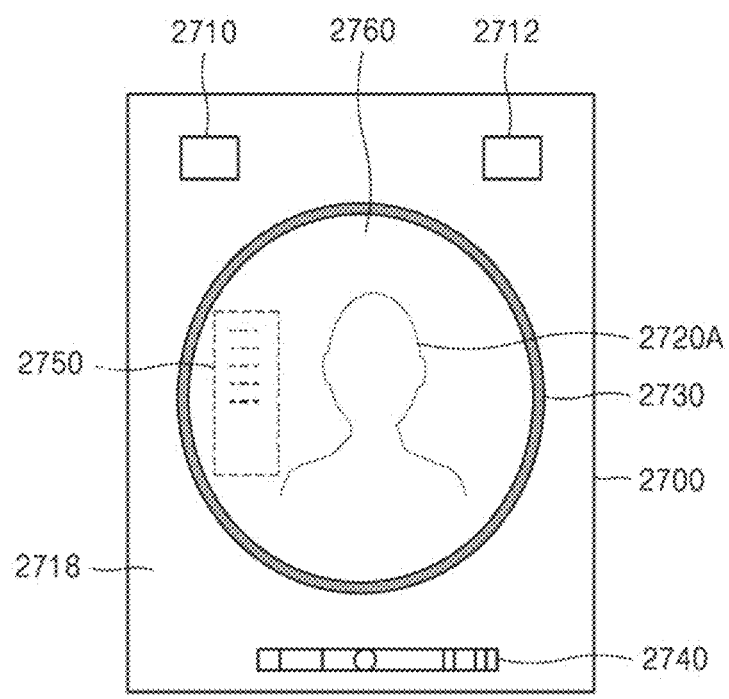
FIG. 28 is a front view of a mirror-type display apparatus including a dual camera module according to an example embodiment.

FIGS. 27 and 28 show a mirror-type display apparatus 2700 (i.e., a mirror display apparatus) including a dual camera module according to an example embodiment. FIG. 27 is a side view and FIG. 28 is a front view.

Referring to FIG. 27, a subject 2720 may see itself through the mirror-type display apparatus 2700, and an image of the subject 2720 (e.g., a hyperspectral image of the subject) may be photographed through the first and second cameras 2710 and 2712 mounted on the display apparatus 2700. The display apparatus 2700 may include a driving control circuit unit 2716 that performs operations and controls related to photographing the subject 2720 and operations and controls related to displaying a hyperspectral image of a photographed subject. The driving control circuit unit 2716 may be built in the display apparatus 2700 so that the driving control circuit unit 2716 is not visible from the outside.

Referring to FIG. 28, the mirror-type display apparatus 2700 may include first and second cameras 2710 and 2712 on a front surface 2718 thereof. The first and second cameras 2710 and 2712 respectively may be disposed at both sides of the upper end of the front surface 2718 thereof. The first camera 2710 may be disposed on the left side and the second camera 2712 may be disposed on the right side. The disposition of the first and second cameras 2710 and 2712 may be interchanged. Positions of the first and second cameras 2710 and 2712 may be changed. For example, the first and second cameras 2710 and 2712 may be positioned at the top center of the front surface 2718, or may be disposed up and down side by side at the top left or right side. One of the first and second cameras 2710 and 2712 may be the RGB camera module 110 of FIG. 1 or may include the RGB camera module 110, and the other one may be the hyperspectral camera module 120 of FIG. 1 or may include the hyperspectral camera module 120. A display region 2760 is located at the center of the front surface 2718 below the first and second cameras 2710 and 2712. The display region 2760 may be a region where an image and a hyperspectral image photographed with a camera module including the first and second cameras 2710 and 2712 or a spectral information, such as spectrum is displayed. When the display apparatus 2700 is in an off state, the display region 2760 may be used as a general mirror. The driving control circuit unit 2716 of FIG. 27 may be disposed behind the display region 2760. Also, if the sizes of the first and second cameras 2710 and 2712 are small enough to be inconspicuous, the first and second cameras 2710 and 2712 may be installed at positions in the display region 2760 where the subject 2720 is optimally photographed. The display region 2760 may be surrounded by a light source 2730. The light source 2730 may be a boundary of the display region 2760. The light source 2730 may be a boundary that separates the display region 2760 from a non-display region, but in another example, the front surface 2718 may entirely be a mirror-type display region. In other words, a region outside the light source 2730 may also be used as a display region having the same function as the display area 2760. In another example, the region outside the light source 2730 may be a passive display region, such as a simple mirror rather than an active display region, such as the display region 2760. The light source 2730 may have a configuration to emit light in a visible band, or may have a configuration to emit infrared rays. The display region 2760 may be a circle or an ellipse, or a shape like a circle or an ellipse, but may be designed in a quadrangle or other shape. As a hyperspectral image 2720A of the subject 2720 is displayed on the display region 2760, information obtained through the hyperspectral image 2720A or information that may be obtained through the hyperspectral image 2720A may be displayed together. The information may be displayed in a predetermined region 2750 in the display region 2760. The information displayed on the predetermined region 2750 may include information that may be helpful for a user's beauty or treatment (e.g., product information for beauty or treatment).

A control unit or an operation unit 2740 is provided in a lower end of the front surface 2718. The operation unit 2740 may be a portion controlling a turn on/off operation of the display region 2760 or an operation in the display region 2760. As a result, an overall driving control of the display apparatus 2700 may be performed through the operation unit 2740.

Next, a method of operating an electronic apparatus including a dual camera module according to an example embodiment will be described with reference to FIG. 29. The method of operation consequently includes a method of increasing the resolution of a hyperspectral image, and may be performed as described with reference to FIGS. 7 to 9 based on the spectral pixel concept described with reference to FIG. 6.

Figure 29:
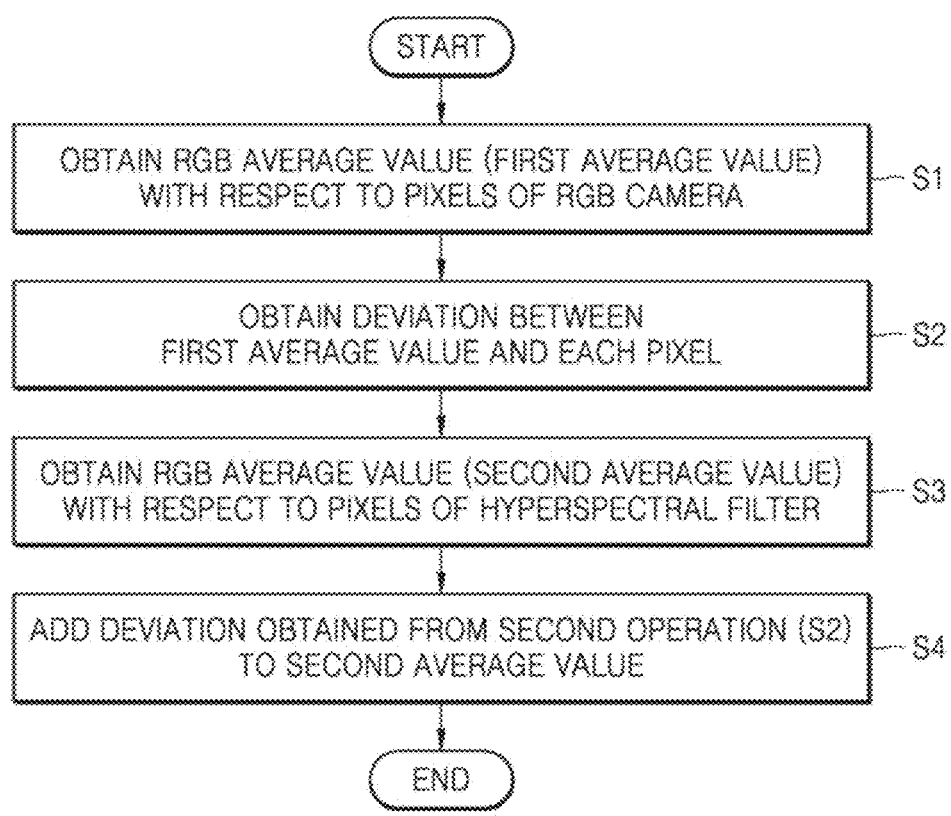
FIG. 29 is a flowchart of a method of operating an electronic apparatus including a dual camera module, according to an example embodiment.

Referring to FIG. 29, first, in a process of acquiring an RGB image of the subject 150 by using the RGB camera module 110, RGB average values (first average values) with respect to pixels of the first image sensor 110B of the RGB camera module 110 are obtained (S1), and deviations between the first average values and each of the pixels are obtained (S2). Next, in a process of acquiring the hyperspectral image of the subject 150 by using the hyperspectral camera module 120, RGB average values (second average values) with respect to pixels of the hyperspectral filter 370 corresponding to the pixels of the first image sensor 110B of the RGB camera module 110 are obtained (S3). The second average values may be obtained by using the method of obtaining the RGB average value with respect to the plurality of spectral pixels after mapping channels included in the unit pixels of the hyperspectral filter 370 to a plurality of virtual spectral pixels as described with reference to FIG. 6. When the number of sub-pixels constituting the unit pixels included in the first image sensor 110B of the RGB camera module 110 is four and the unit pixels included in the hyperspectral filter 370 have N channels, the number of spectral pixels is N/4, and the number of the spectral pixels is N/6 when the number of the sub-pixels constituting the unit pixels included in the first image sensor 110B of the RGB camera module 110 is six. Next, in order to obtain a corrected RGB value for each of the spectral pixels, a deviation of each pixel corresponding to each of the spectral pixels is added to the second average value (S4). For example, if the first spectral pixel (SP1 of FIG. 6) of the plurality of spectral pixels corresponds to the first pixel (for example, P1 of FIG. 4) of the RGB camera module 110, a value obtained by adding a deviation (first average value–RGB value of the first pixel P1) with respect to the first pixel P1 to the second average value may be a corrected RGB value with respect to the first spectral pixel SP1. In this way, the correction for the plurality of spectral pixels is completed. By performing this process for all pixels included in the hyperspectral filter 370, as a result, resolution correction with respect to a hyperspectral image may be achieved.

The dual camera module described above includes an RGB camera module and a hyperspectral camera module, and thus, the resolution of a hyperspectral image obtained by the hyperspectral camera may be increased by applying spectral information obtained from the RGB camera module to the hyperspectral camera module.

As a result, when the dual camera module according to an example embodiment is used, a hyperspectral image with increased resolution may be provided together with accurate spectral information, and thus, a further accurate face recognition may be achieved in a security field. Also, an error caused by a distance difference between two cameras may be corrected by using image information obtained from two different cameras. Also, it is possible to correct an image non-uniformity that occurs due to an uneven illumination, a visual angle difference between the two cameras, and/or a surface curvature of a three-dimensional object.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims.

What is claimed is:

1. A dual camera module providing a corrected image of a hyperspectral image, the dual camera module comprising:
    a hyperspectral camera module configured to provide a hyperspectral image of a subject; and
    an RGB camera module configured to:
        provide an image of the subject, and
        obtain an RGB correction value applied to correction of the hyperspectral image.

2. The dual camera module of claim 1, wherein the image of the subject provided by the RGB camera module comprises an RGB image obtained by using red light, green light, and blue light as a main light, or an image obtained by using infrared light together with red light, green light, and blue light as the main light.

3. The dual camera module of claim 2, wherein the main light further includes ultraviolet light.

4. The dual camera module of claim 1, wherein the RGB camera module comprises:
    a first optical guide module; and
    a first image sensor configured to sense the image of the subject.

5. The dual camera module of claim 4, wherein the first image sensor comprises a plurality of pixels, and each pixel of the plurality of pixels comprises four different sub-pixels.

6. The dual camera module of claim 4, wherein the first image sensor comprises a plurality of pixels, and each pixel of the plurality of pixels comprises six sub-pixels.

7. The dual camera module of claim 6, wherein five sub-pixels of the six sub-pixels are different from each other.

8. The dual camera module of claim 1, wherein the hyperspectral camera module comprises:
    a second optical guide module;
    a hyperspectral filter configured to generate the hyperspectral image; and
    a second image sensor configured to sense the hyperspectral image.

9. The dual camera module of claim 8, further comprising a low pass filter provided between the second optical guide module and the hyperspectral filter.

10. An electronic apparatus comprising:
    a display on which an image of a subject is displayed;
    a dual camera module configured to provide a corrected image of a hyperspectral image of the subject;
    a driving control circuit unit configured to control the dual camera module; and
    a battery that provides power to the dual camera module,
    wherein the dual camera module comprises:
        a hyperspectral camera module configured to provide the hyperspectral image of the subject; and
        an RGB camera module configured to provide the image of the subject and obtain an RGB correction value applied to correction of the hyperspectral image.

11. The electronic apparatus of claim 10, further comprising a light source configured to illuminate the subject.

* * * * *